US012322860B2

(12) United States Patent
Chiang

(10) Patent No.: US 12,322,860 B2
(45) Date of Patent: Jun. 3, 2025

(54) ANTENNA DEVICE

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 153 days.

(21) Appl. No.: 18/137,501

(22) Filed: Apr. 21, 2023

(65) Prior Publication Data

US 2024/0356233 A1 Oct. 24, 2024

(51) Int. Cl.
*H01Q 13/02* (2006.01)
*H01Q 9/04* (2006.01)

(52) U.S. Cl.
CPC ....... *H01Q 13/0241* (2013.01); *H01Q 9/0414* (2013.01)

(58) Field of Classification Search
CPC ......................... H01Q 13/0241; H01Q 9/0414
See application file for complete search history.

(56) References Cited

U.S. PATENT DOCUMENTS

2020/0266519 A1 8/2020 Lee et al.
2020/0303833 A1* 9/2020 Ueda .................... H01Q 1/2283
2021/0210867 A1 7/2021 Panther et al.
2022/0302603 A1 9/2022 Chieh et al.

FOREIGN PATENT DOCUMENTS

JP H06112724 A * 4/1994
JP H0878947 A * 3/1996
JP 2017102789 A 6/2017

* cited by examiner

*Primary Examiner* — Dieu Hien T Duong
(74) *Attorney, Agent, or Firm* — Li & Cai Intellectual Property (USA) Office

(57) ABSTRACT

An antenna device includes a carrier and an antenna array. A first dual-frequency antenna structure of the antenna array includes a first conductive sheet, a first transmitting antenna, and a first receiving antenna. A first extension line passes through both two centers of two regions defined by respectively and orthogonally projecting the first transmitting antenna and the first receiving antenna onto the first conductive sheet. A second dual-frequency antenna structure of the antenna array includes a second conductive sheet, a second transmitting antenna, and a second receiving antenna. A second extension line passes through both two centers of two regions defined by respectively and orthogonally projecting the second transmitting antenna and the second receiving antenna onto the second conductive sheet. The first and second conductive sheets have a four-fold rotational symmetry relative to an intersection point between the first extension line and the second extension line.

7 Claims, 25 Drawing Sheets

ANTENNA DEVICE

FIELD OF THE DISCLOSURE

The present disclosure relates to a device, and more particularly to an antenna device.

BACKGROUND OF THE DISCLOSURE

In order to have specific functions (e.g., multi-input multi-output (MIMO)), a conventional antenna device has a substrate and a plurality of dual-frequency antennas that are mounted on the substrate and are arranged in an array. However, when the conventional antenna device is designed to have an optimal circular polarization pattern, an arrangement space of the dual-frequency antennas will be expanded, so that a size of the substrate is difficult to be reduced. In other words, the conventional antenna device cannot have the advantages of "reduced size" and "optimal circular polarization pattern" at the same time.

SUMMARY OF THE DISCLOSURE

In response to the above-referenced technical inadequacy, the present disclosure provides an antenna device.

In order to solve the above-mentioned problem, one of the technical aspects adopted by the present disclosure is to provide an antenna device. The antenna device includes a carrier and at least one antenna array. The at least one antenna array is disposed on the carrier, and the at least one antenna array includes a first dual-frequency antenna structure and a second dual-frequency antenna structure. The first dual-frequency antenna structure includes a first conductive sheet, and a first transmitting antenna and a first receiving antenna that are electrically coupled to the first conductive sheet. A first extension line passes through both a center of a projection region defined by orthogonally projecting the first transmitting antenna onto the first conductive sheet and a center of a projection region defined by orthogonally projecting the first receiving antenna onto the first conductive sheet. The second dual-frequency antenna structure includes a second conductive sheet, and a second transmitting antenna and a second receiving antenna that are electrically coupled to the second conductive sheet. A second extension line passes through both a center of a projection region defined by orthogonally projecting the second transmitting antenna onto the second conductive sheet and a center of a projection region defined by orthogonally projecting the second receiving antenna onto the second conductive sheet. The first extension line and the second extension line have an angle of 90 degrees there-between and an intersection point, and the first conductive sheet and the second conductive sheet have a four-fold rotational symmetry relative to the intersection point.

Therefore, in the antenna device provided by the present disclosure, by virtue of "a first extension line passing through both a center of a projection region defined by orthogonally projecting the first transmitting antenna onto the first conductive sheet and a center of a projection region defined by orthogonally projecting the first receiving antenna onto the first conductive sheet," "a second extension line passing through both a center of a projection region defined by orthogonally projecting the second transmitting antenna onto the second conductive sheet and a center of a projection region defined by orthogonally projecting the second receiving antenna onto the second conductive sheet," and "the first extension line and the second extension line having an angle of 90 degrees there-between and an intersection point, and the first conductive sheet and the second conductive sheet having a four-fold rotational symmetry relative to the intersection point," the antenna device can not only have an effect of an ideal circular polarization pattern, but also have a reduced size.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
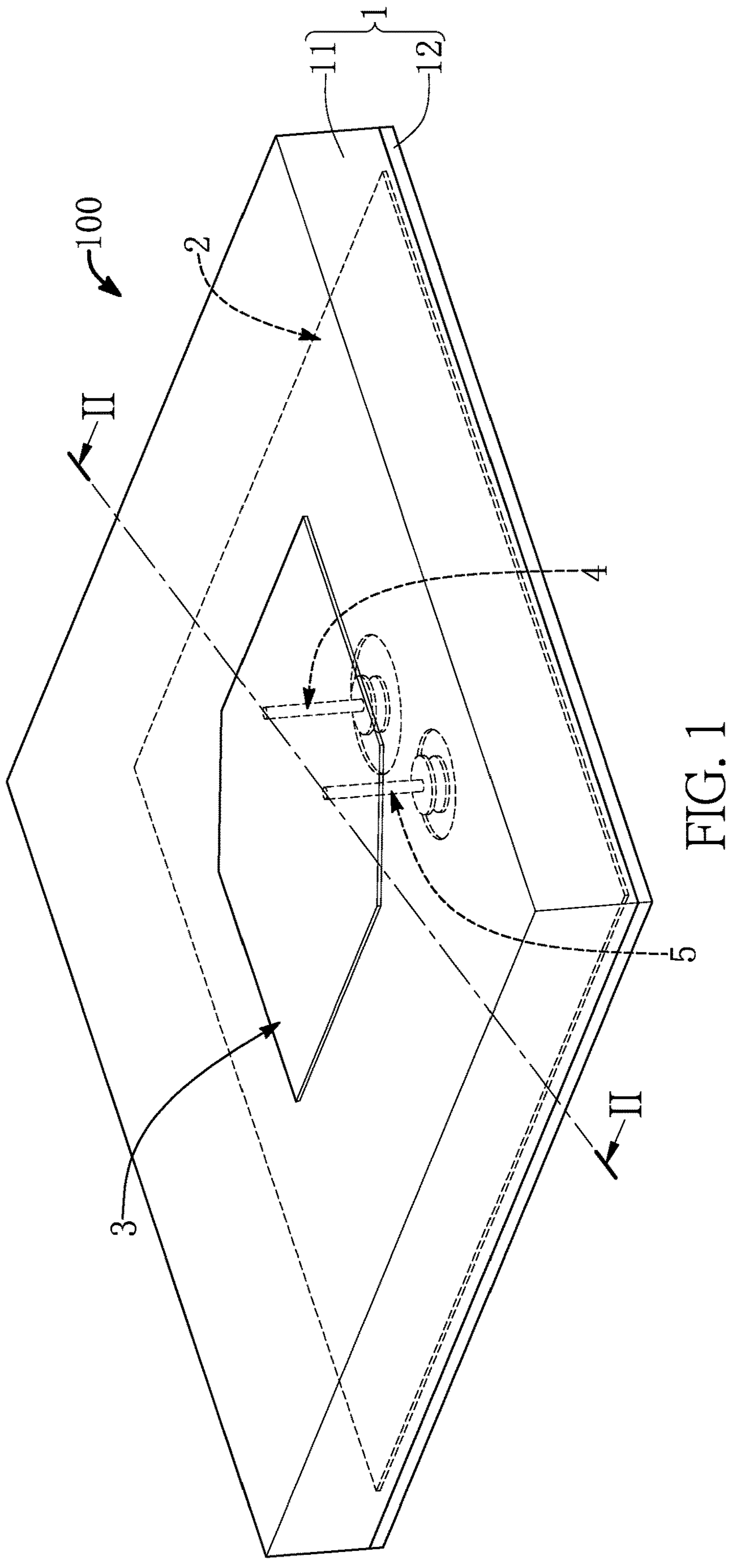
FIG. 1 is a schematic perspective view of a dual-frequency antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In the following description, if it is indicated that "reference is made to a specific figure" or "as shown in a specific figure", this is only to emphasize that in the description that follows, most content related thereto is depicted in said specific figure. However, the description that follows should not be construed as being limited to say specific figure only.

First Embodiment

Figure 2:
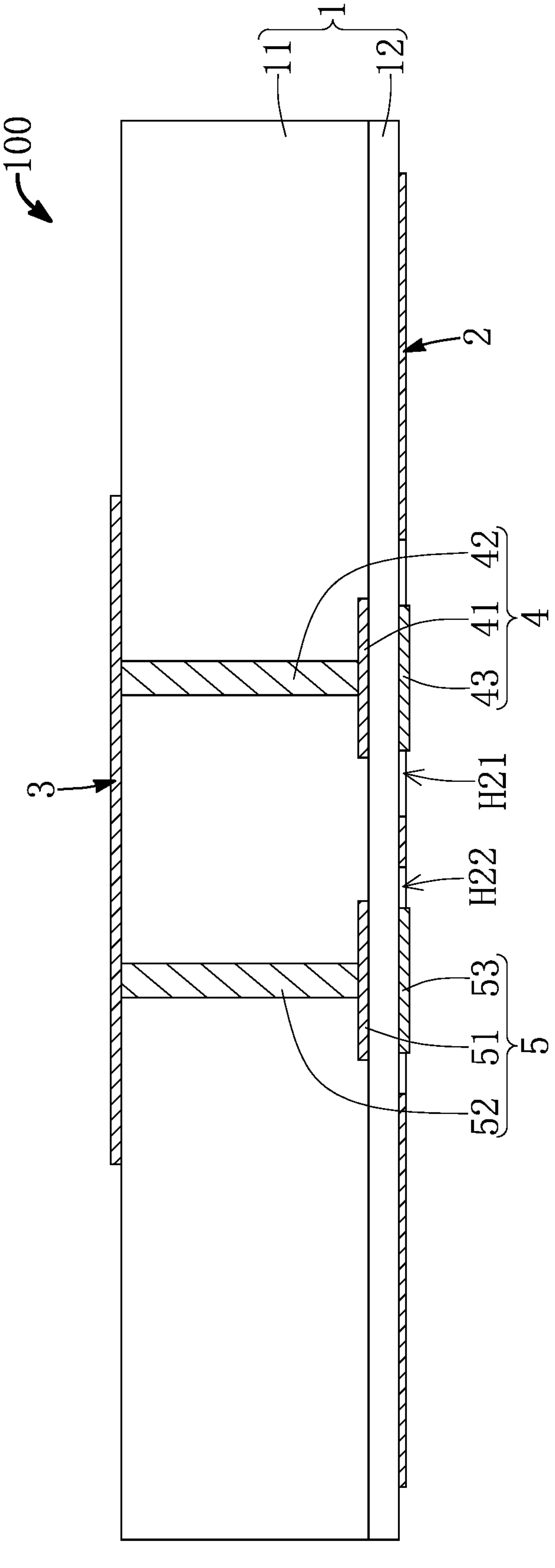
FIG. 2 is a schematic cross-sectional view taken along line II-II of FIG. 1.

Referring to FIG. 1 to FIG. 5, a first embodiment of the present disclosure provides a dual-frequency antenna structure 100. As shown in FIG. 1 and FIG. 2, the dual-frequency antenna structure 100 is suitable for a transmission frequency band having a transmission frequency and a reception frequency. The dual-frequency antenna structure 100 includes a substrate 1, and a grounding element 2, a conductive sheet 3, a transmitting antenna 4, and a receiving antenna 5 that are disposed on the substrate 1. The following description describes the structure and connection relation of each component of the dual-frequency antenna structure 100.

Referring to FIG. 2, the substrate 1 in the present embodiment is a multi-layer structure and has two printed circuit boards. The two printed circuit boards are stacked together, and are respectively defined as a first layer 11 and a second layer 12.

Figure 4:
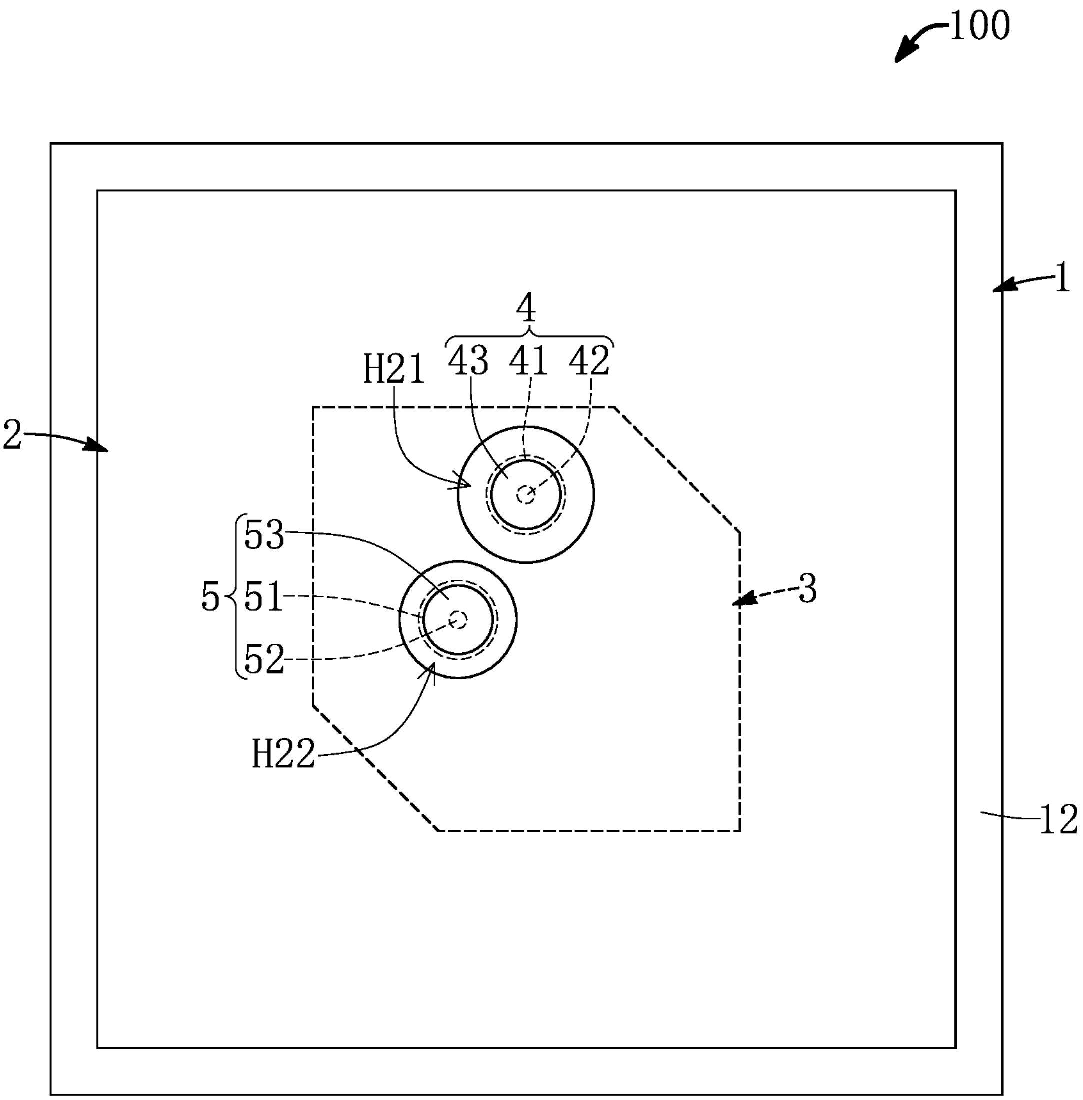
FIG. 4 is a schematic bottom view of the dual-frequency antenna structure according to the first embodiment of the present disclosure.

Referring to FIG. 2 and FIG. 4, the grounding element 2 in the present embodiment may be a conductive copper foil, but the present disclosure is not limited thereto. The grounding element 2 is disposed on a side surface of the second layer 12 away from the first layer 11, and the grounding element 2 has a first through hole H21 and a second through hole H22 that are in circular shapes and spaced apart from each other on the second layer 12. In other words, the side surface of the second layer 12 away from the first layer 11 has two configuration areas that are not covered by the grounding element 2.

Figure 3:
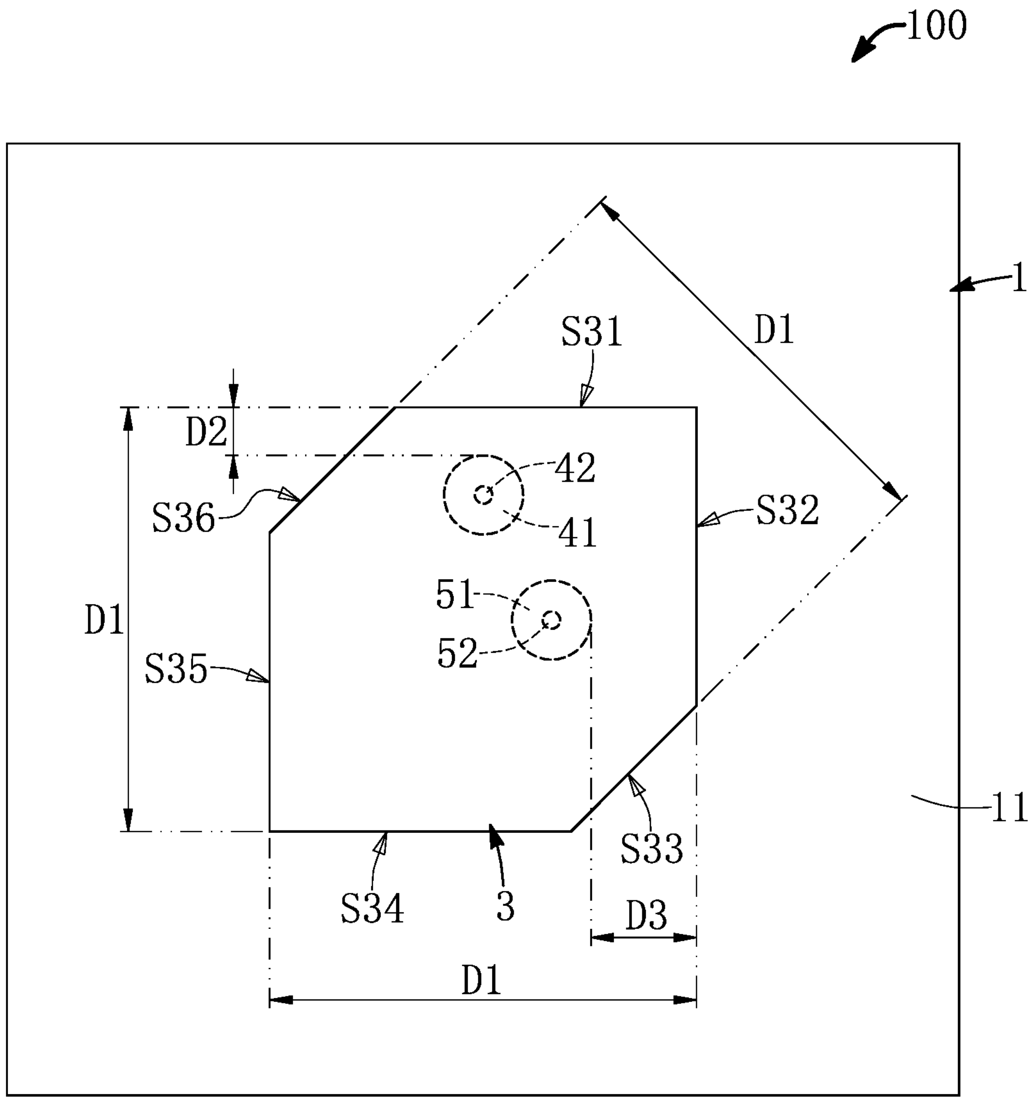
FIG. 3 is a schematic top view of the dual-frequency antenna structure according to the first embodiment of the present disclosure.

Referring to FIG. 2 and FIG. 3, the conductive sheet 3 is disposed on a surface side of the first layer 11 away from the second layer 12. The conductive sheet 3 in the present embodiment is a conductive copper foil having a hexagonal structure and has six sides. Any two opposite ones of the six sides are parallel to each other and have a first shortest distance D1 there-between. The first shortest distance D1 is within a range from 0.45 to 0.55 times a wavelength corresponding to a center frequency of the transmission frequency band.

For example, the conductive sheet 3 has a first side S31, a second side S32, a third side S33, a fourth side S34, a fifth side S35, and a sixth side S36 in a clockwise direction. The first side S31 is opposite and parallel to the fourth side S34, the second side S32 is opposite and parallel to the fifth side S35, and the third side S33 is opposite and parallel to the sixth side S36. When the wavelength corresponding to the center frequency of the transmission frequency band is 12 millimeters (mm), a shortest distance between the first side S31 and the fourth side S34, a shortest distance between the second side S32 and the fifth side S35, and a shortest distance between the third side S33 and the sixth side S36 can be within a range from 5.4 millimeters (mm) to 6.6 millimeters (mm).

Referring to FIG. 2 and FIG. 4, the transmitting antenna 4 has the transmitting frequency, and the transmitting antenna 4 includes a first coupling conductive pad 41, a first conductive column 42, and a first feeding conductive pad 43.

The first coupling conductive pad 41 in the present embodiment may be a conductive copper foil that is in a circular shape, but the present disclosure is not limited thereto. The first coupling conductive pad 41 is disposed between the first layer 11 and the second layer 12, so that the first coupling conductive pad 41 is clamped by the two printed circuit boards, and the first coupling conductive pad 41 corresponds in position to the first through hole H21. That is to say, a projection region defined by orthogonally projecting the first coupling conductive pad 41 onto the second layer 12 is located in the first through hole H21.

The first conductive column 42 in the present embodiment can be, for example, a plating through hole or a blind via hole, but the present disclosure is not limited thereto. The first conductive column 42 is electrically coupled to the first coupling conductive pad 41 and the conductive sheet 3.

Referring to FIG. 2 and FIG. 4, the first feeding conductive pad 43 is disposed on the side surface of the second layer 12 away from the first layer 11 and located in the first through hole H21, and the first feeding conductive pad 43 and the first coupling conductive pad 41 can produce a series capacitive effect so as to generate a left-handed circular polarization. In addition, the first feeding conductive pad 43 can also produce a parallel capacitive effect with the grounding element 2.

In the present embodiment, the first feeding conductive pad 43 is a conductive copper foil that is in a circular shape, and a position defined by orthogonally projecting the first feeding conductive pad 43 onto the conductive sheet 3 is adjacent to one of the six sides (i.e., the first side S31). The first feeding conductive pad 43 and the first through hole H21 share a common center. In addition, the center of the first feeding conductive pad 43 is preferably overlapped with a center defined by orthogonally projecting the first coupling conductive pad 41 onto the second layer 12, and an area of the first feeding conductive pad 43 is substantially equal to an area of the first coupling conductive pad 41. In other words, the first feeding conductive pad 43, the first through hole H21, and the first coupling conductive pad 41 have a linkage relationship in terms of size.

Naturally, the linkage relationship allows for slight variations (i.e., permissible tolerances). For example, in another embodiment of the present disclosure (not shown), the area of the first feeding conductive pad 43 may also be slightly greater or less than the area of the first coupling conductive pad 41.

Referring to FIG. 2 and FIG. 4, the receiving antenna 5 has the receiving frequency, and the receiving antenna 5 includes a second coupling conductive pad 51, a second conductive column 52, and a second feeding conductive pad 53. The second coupling conductive pad 51 in the present embodiment may be a conductive copper foil that is in a circular shape, but the present disclosure is not limited thereto. The second coupling conductive pad 51 is disposed between the first layer 11 and the second layer 12, so that the second coupling conductive pad 51 is clamped by the two printed circuit boards, and the second coupling conductive pad 51 corresponds in position to the second through hole H22. That is to say, a projection region defined by orthogonally projecting the second coupling conductive pad 51 onto the second layer 12 is located in the second through hole H22.

The second conductive column 52 in the present embodiment can be, for example, a plating through hole or a blind via hole, but the present disclosure is not limited thereto. The second conductive column 52 is electrically coupled to the second coupling conductive pad 51 and the conductive sheet 3.

Referring to FIG. 2 and FIG. 4, the second feeding conductive pad 53 is disposed on the side surface of the second layer 12 away from the first layer 11 and located in the second through hole H22, and the second feeding conductive pad 53 and the second coupling conductive pad 51 can produce a series capacitive effect so as to generate a right-handed circular polarization. In addition, the second feeding conductive pad 53 can also produce a parallel capacitive effect with the grounding element 2.

In the present embodiment, the second feeding conductive pad 53 is a conductive copper foil that is in a circular shape, and a position defined by orthogonally projecting the second feeding conductive pad 53 toward the conductive sheet 3 is adjacent to one of the six sides (i.e., the second side S32). The second feeding conductive pad 53 and the second through hole H22 share a common center. In addition, the center of the second feeding conductive pad 53 is preferably overlapped with a center defined by orthogonally projecting the second coupling conductive pad 51 onto the second layer 12, and an area of the second feeding conductive pad 53 is substantially equal to an area of the second coupling conductive pad 51. In other words, the second feeding conductive pad 53, the second through hole H22, and the second coupling conductive pad 51 have a linkage relationship in terms of size.

Naturally, the linkage relationship allows for slight variations (i.e., permissible tolerances). For example, in another embodiment of the present disclosure (not shown), the area of the second feeding conductive pad 53 may also be slightly greater or less than the area of the second coupling conductive pad 51.

It is worth mentioning that, in order to ensure that the series capacitive effect of the first feeding conductive pad 43 and that of the second feeding conductive pad 53 are not disturbed, an area of a projection region defined by orthogonally projecting the first coupling conductive pad 41 onto the second layer 12 is less than or equal to an area of the first through hole H21, and an area of a projection region defined by orthogonally projecting the second coupling conductive pad 51 onto the second layer 12 is less than or equal to an area of the second through hole H22.

Therefore, a second shortest distance D2 between a position defined by orthogonally projecting the first coupling conductive pad 41 (or the first feeding conductive pad 43) onto the conductive sheet 3 and the first side S31 can be not equal to a third shortest distance D3 between a position defined by orthogonally projecting the second coupling conductive pad 51 (or the second feeding conductive pad 43) onto the conductive sheet 3 and the second side S32, and the second shortest distance D2 is less than the third shortest distance D3, so that the transmission frequency and the reception frequency can have different ranges.

Figure 5:
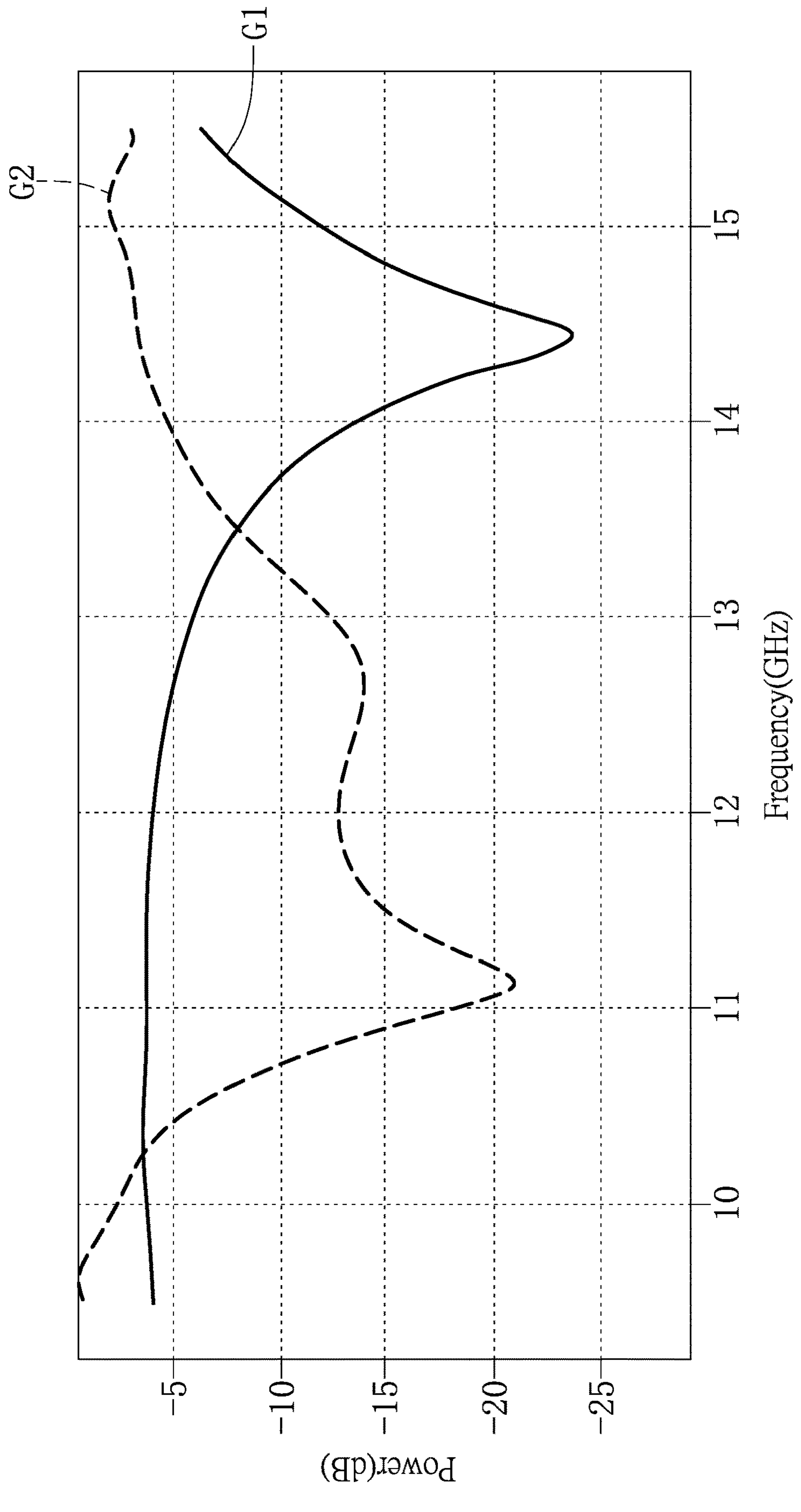
FIG. 5 is a diagram showing return loss data measured by the dual-frequency antenna structure according to the first embodiment of the present disclosure.

In particular, FIG. 5 is a diagram showing return loss data measured by the dual-frequency antenna structure 100 according to the present disclosure, and the diagram has a transmission data line G1 and a receive data line G2. It can be clearly seen from the diagram that the transmission data line G1 has lower power within a range from 14 GHz to 15 GHz, and the receive data line G2 has lower power within a range from 10 GHz to 12.7 GHz. That is to say, the transmission frequency of the dual-frequency antenna structure 100 of the present disclosure is preferably limited within the range from 14 GHz to 15 GHz, and the reception frequency is preferably limited within a range from 10.7 GHz to 12.7 GHz.

Second Embodiment

Referring to FIG. 6 to FIG. 18, a second embodiment of the present disclosure provides an antenna device 1000. The antenna device 1000 includes a carrier BR, and an antenna array AR that is disposed on the carrier BR. The antenna array AR includes two dual-frequency antenna structures of the first embodiment, and the two dual-frequency antenna structures are defined as a first dual-frequency antenna structure 100A and a second dual-frequency antenna structure 100B. In addition, the carrier BR is a common substrate of the two dual-frequency antenna structures of the first embodiment, and the carrier BR has the same structure as the substrate of each of the dual-frequency antenna structures.

In other words, with regard to the detailed structure of the carrier BR, the first dual-frequency antenna structure 100A, and the second dual-frequency antenna structure 100B, reference can be made to the dual-frequency antenna structure 100 of the first embodiment, and details thereof will not be repeated herein. The following description describes a configuration relationship between the first dual-frequency antenna structure 100A and the second dual-frequency antenna structure 100B.

Figure 6:
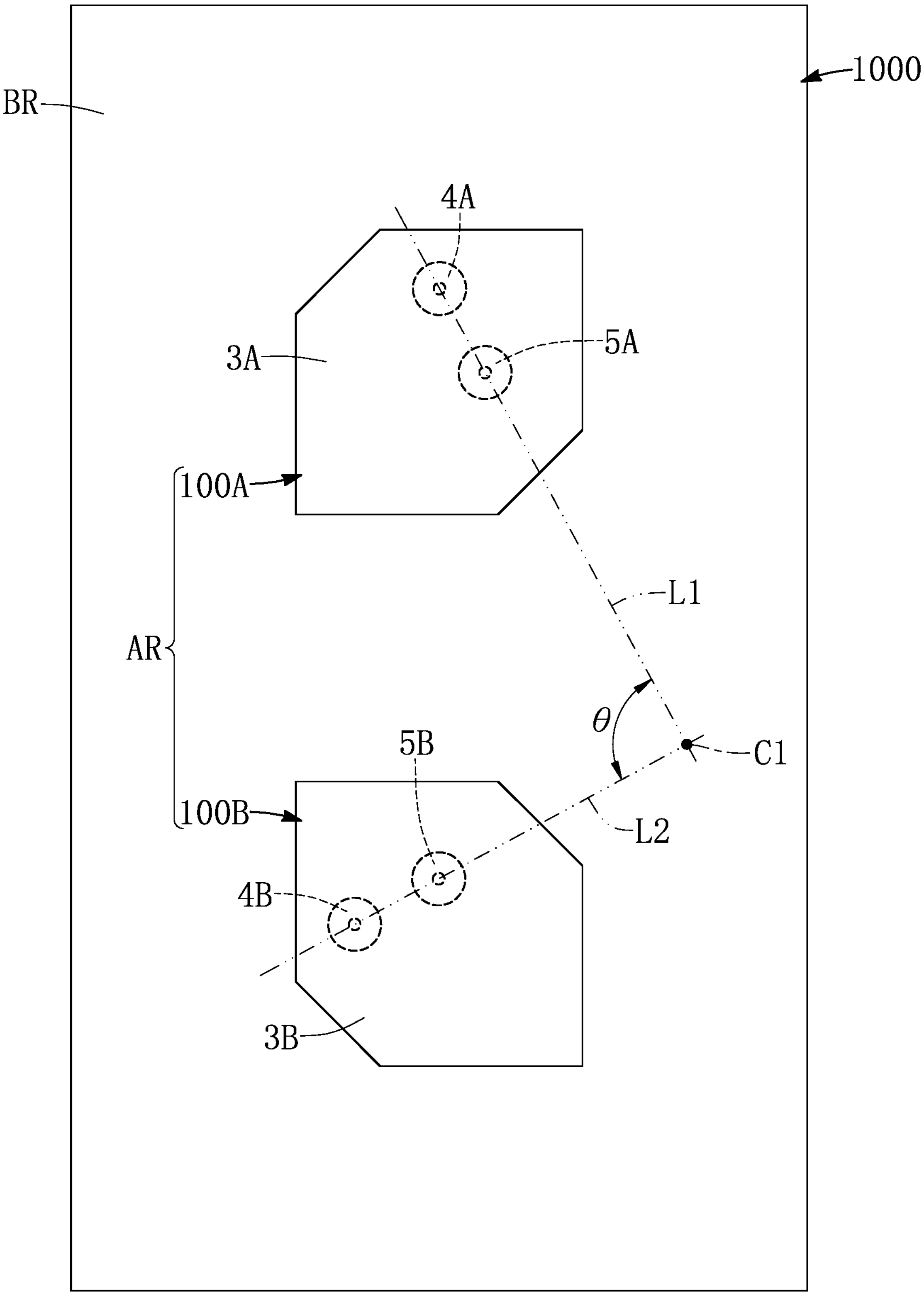
FIG. 6 is a schematic planar view of the dual-frequency antenna structure according to a second embodiment of the present disclosure.

Referring to FIG. 6, the first dual-frequency antenna structure 100A includes a first conductive sheet 3A, and a first transmitting antenna 4A and a first receiving antenna 5A that are electrically coupled to the first conductive sheet 3A. In the present embodiment, the first conductive sheet 3A is in a hexagonal shape, and each of the first transmitting antenna 4A and the first receiving antenna 5A is in a circular shape. A center of a region (i.e., a center of circle) defined by orthogonally projecting the first transmitting antenna 4A onto the first conductive sheet 3A and a center of a region (i.e., a center of circle) defined by orthogonally projecting the first receiving antenna 5A onto the first conductive sheet 3A are jointly crossed by a first extension line L1.

Referring to FIG. 6, the second dual-frequency antenna structure 100B includes a second conductive sheet 3B, and a second transmitting antenna 4B and a second receiving antenna 5B that are electrically coupled to the second conductive sheet 3B. In the present embodiment, the second conductive sheet 3B is in a hexagonal shape, and each of the second transmitting antenna 4B and the second receiving antenna 5B is in a circular shape. A center of a region (i.e., a center of circle) defined by orthogonally projecting the second transmitting antenna 4B onto the second conductive sheet 3B and a center of a region (i.e., a center of circle) defined by orthogonally projecting the second receiving antenna 5B onto the second conductive sheet 3B are jointly crossed by a second extension line L2.

The first extension line L1 and the second extension line L2 have an angle θ of 90 degrees there-between and an intersection point C1, and the first conductive sheet 3A and the second conductive sheet 3B have a four-fold rotational symmetry relative to the intersection point C1. Accordingly, the first dual-frequency antenna structure 100A and the second dual-frequency antenna structure 100B can generate a circularly polarized radiation pattern and occupy a minimum space on the carrier BR (i.e., a distance between the first dual-frequency antenna structure 100A and the second dual-frequency antenna structure 100B can be the shortest).

It should be noted that a phase difference between the first transmitting antenna 4A and the second transmitting antenna 4B is preferably 90 degrees. In this way, an electromagnetic field of the first transmitting antenna 4A and an electromagnetic field of the second transmitting antenna 4B can be perpendicular to each other on an elevation plane (i.e., theta) and an azimuth plane (i.e., phi), so as to produce a left-handed circular polarization (LHCP).

Figure 7:
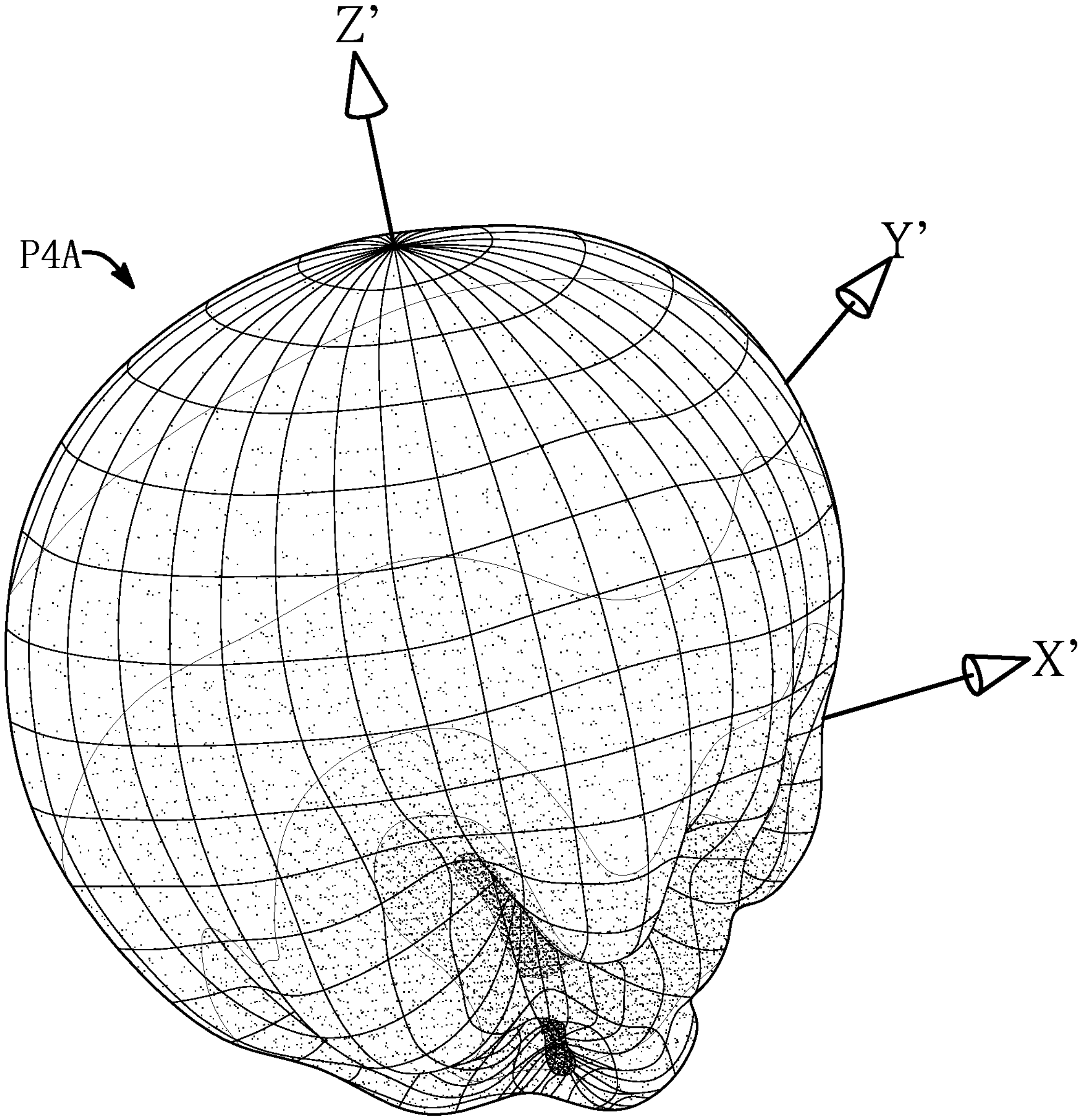
FIG. 7 is a schematic diagram of a radiation pattern generated from a first transmitting antenna of the dual-frequency antenna structure according to the second embodiment of the present disclosure.
Figure 8:
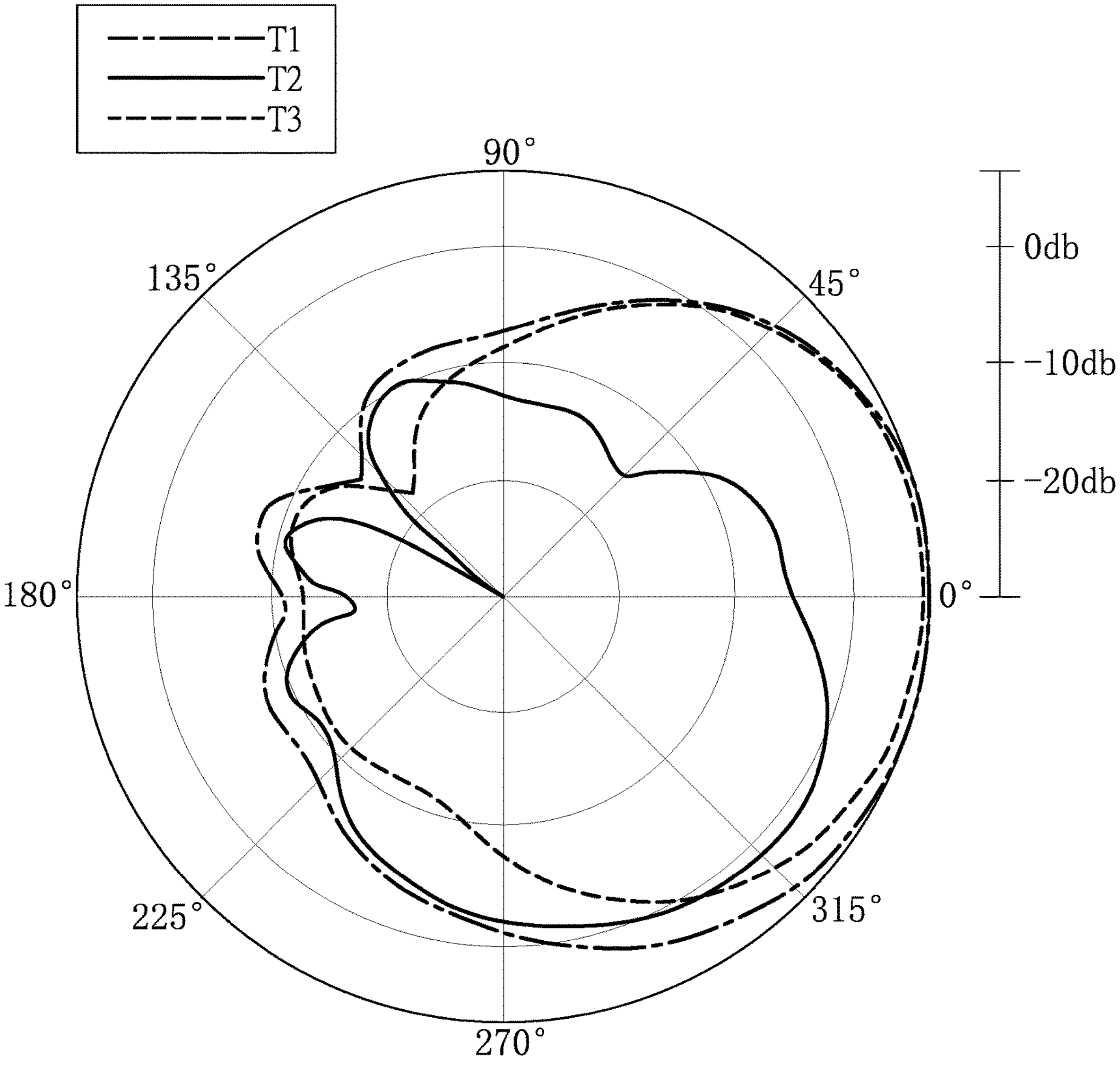
FIG. 8 is a schematic view of the radiation pattern of FIG. 7 in an H-plane or an E-plane.
Figure 9:
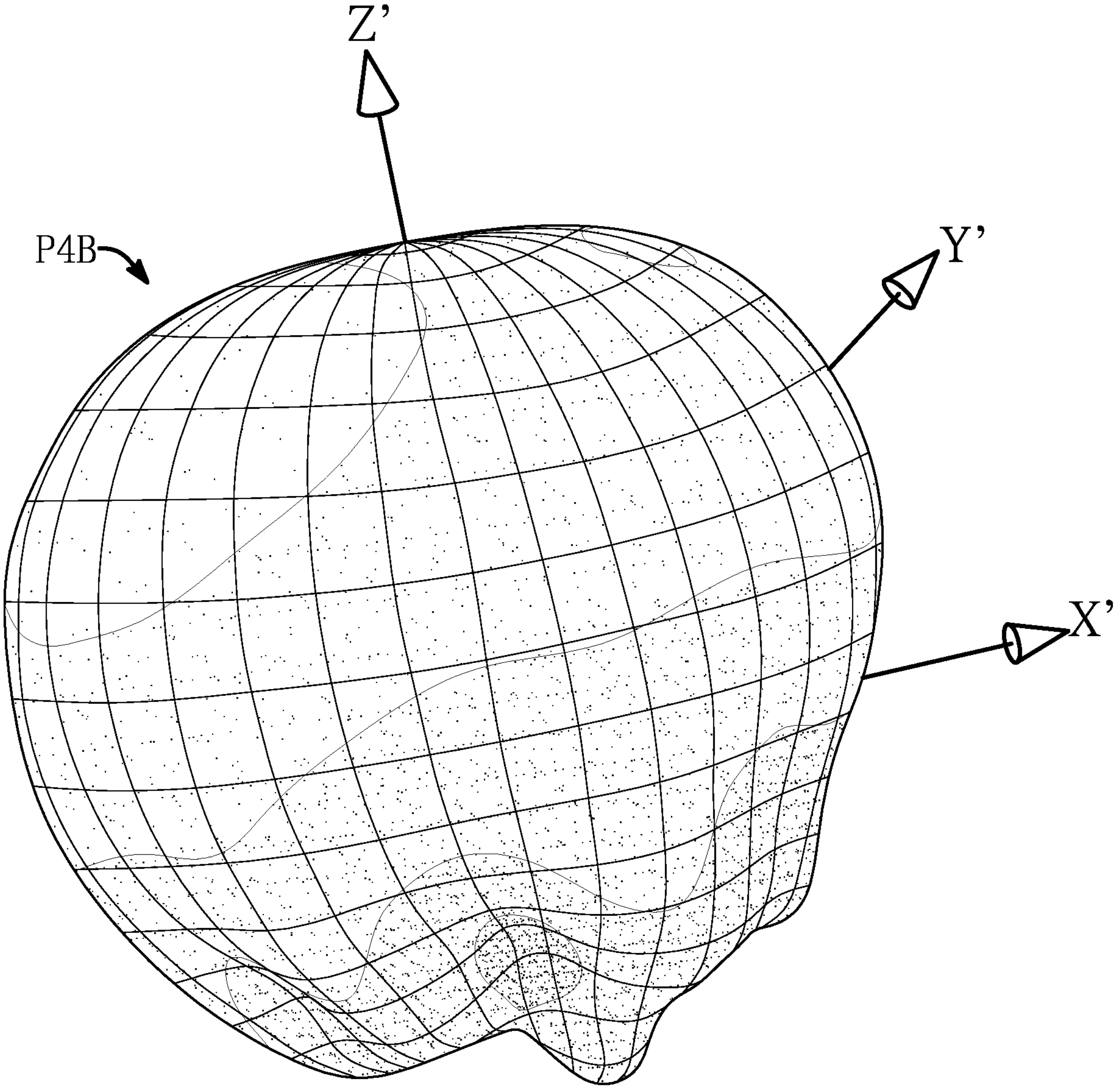
FIG. 9 is a schematic diagram of a radiation pattern generated from a second transmitting antenna of the dual-frequency antenna structure according to the second embodiment of the present disclosure.
Figure 10:
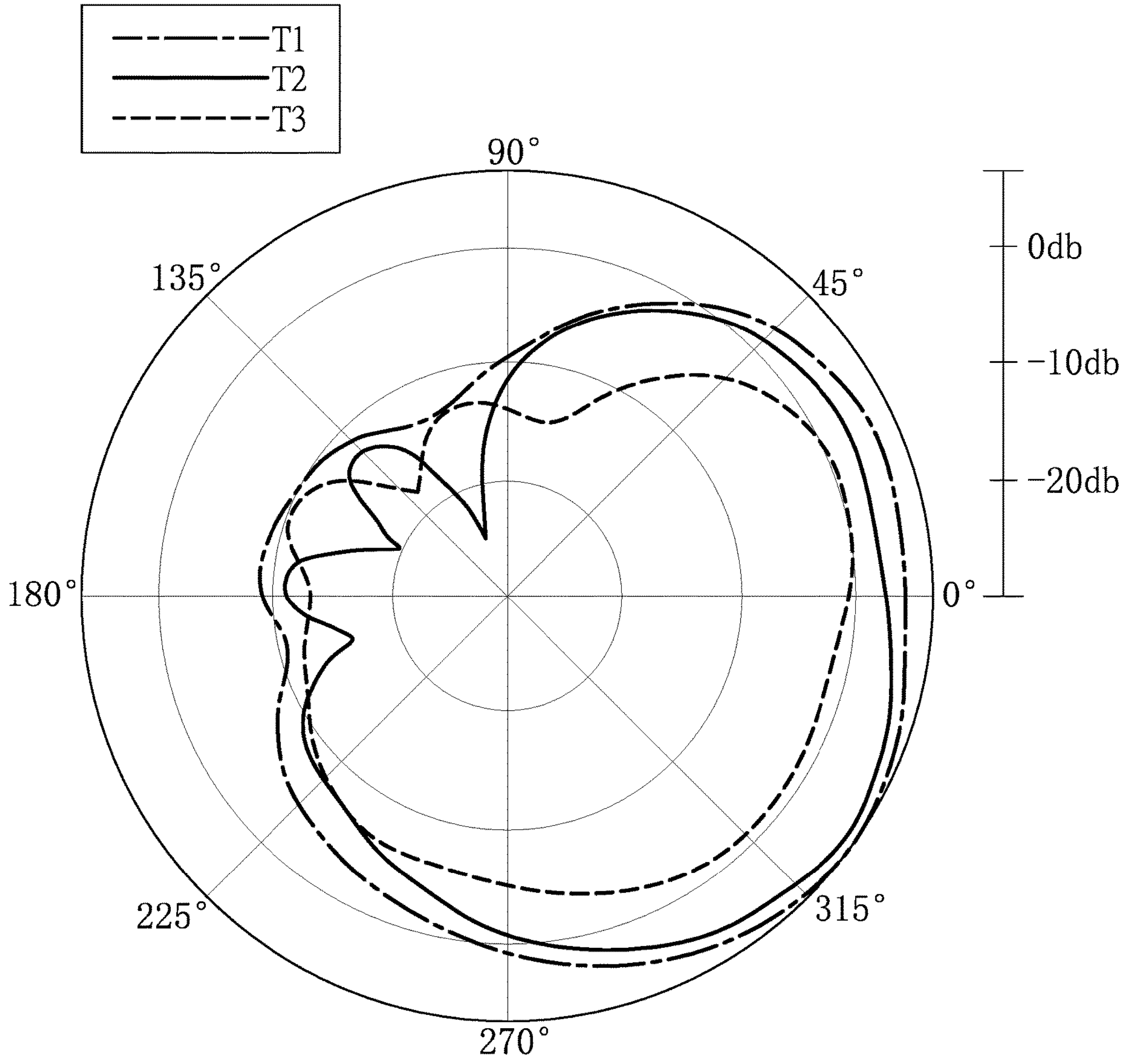
FIG. 10 is a schematic view of the radiation pattern of FIG. 9 in the H-plane or the E-plane.
Figure 11:
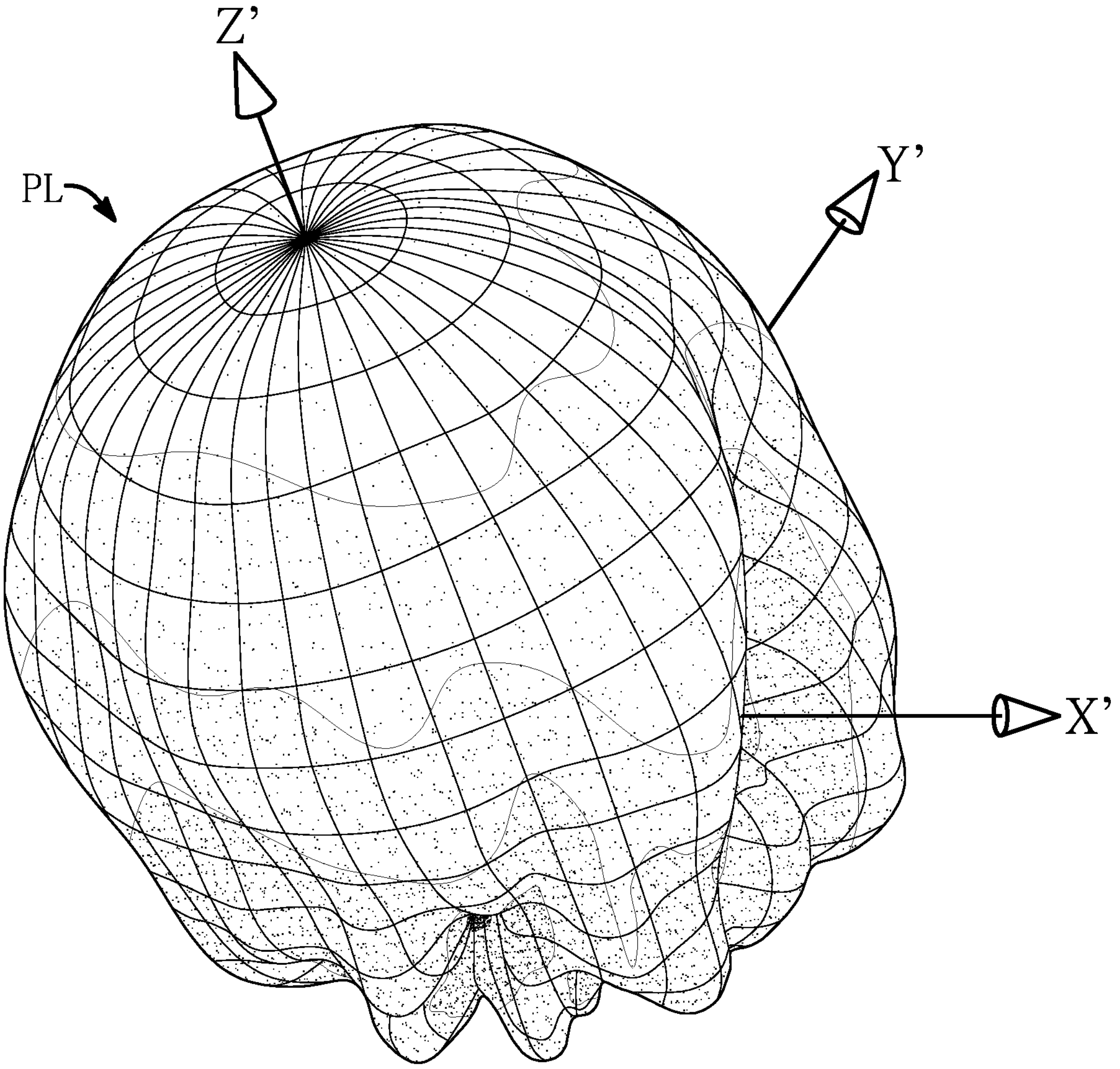
FIG. 11 is a schematic diagram of a radiation pattern jointly generated from the first transmitting antenna and the second transmitting antenna of the dual-frequency antenna structure according to the second embodiment of the present disclosure.
Figure 12:
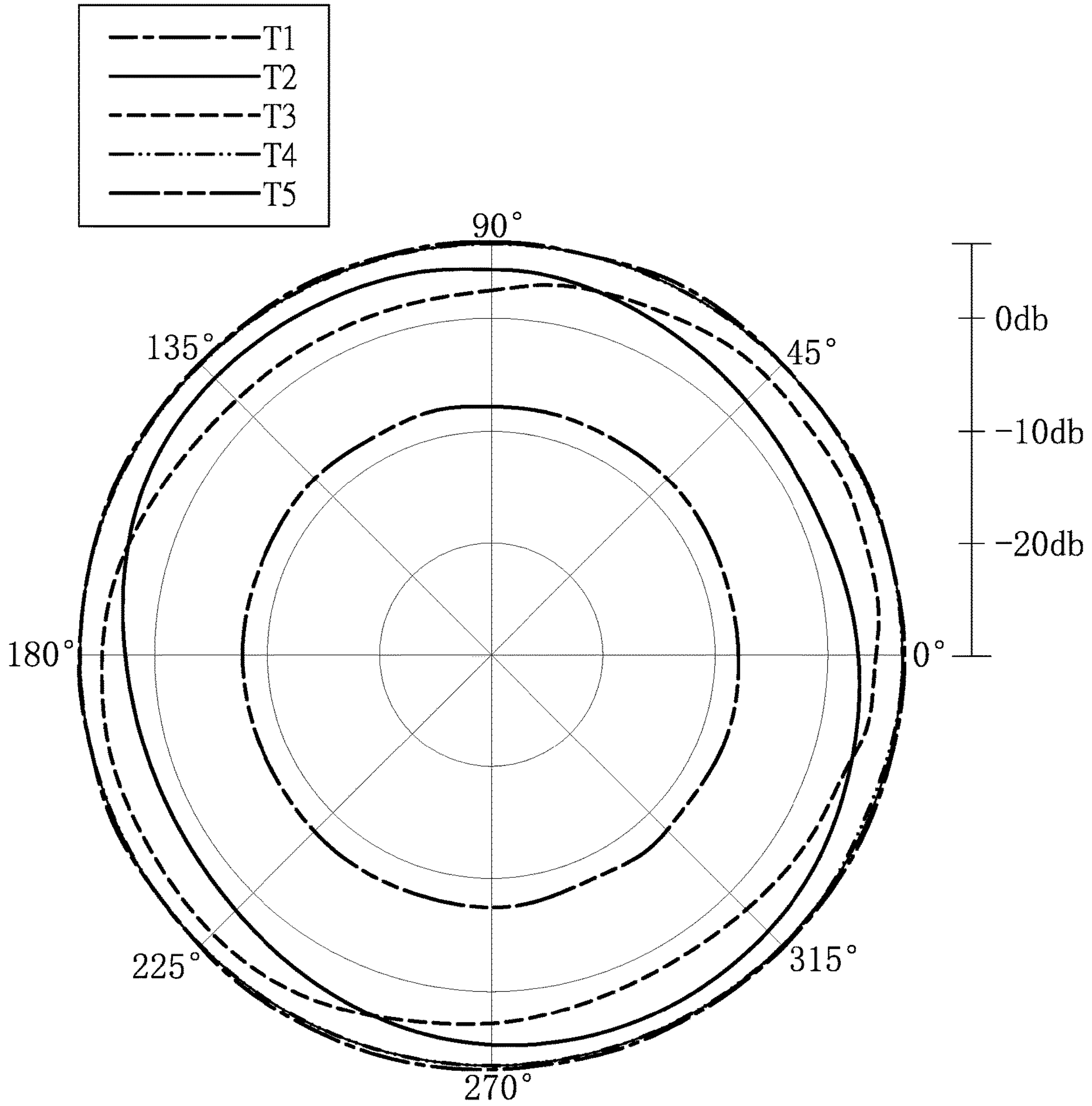
FIG. 12 is a schematic view of the radiation pattern of FIG. 11 in the H-plane or the E-plane.

For example, as shown in FIG. 7, the first transmitting antenna 4A of the present embodiment can independently generate a radiation pattern P4A in a frequency, and FIG. 8 is a schematic view of the radiation pattern P4A of FIG. 7 in an H-plane or an E-plane. As shown in FIG. 9, the second transmitting antenna 4B of the present embodiment can independently generate a radiation pattern P4B in a frequency, and FIG. 10 is a schematic view of the radiation pattern P4B of FIG. 9 in an H-plane or an E-plane. As shown in FIG. 11, the first transmitting antenna 4A and the second transmitting antenna 4B of the present embodiment can jointly generate a left-handed circularly polarized radiation pattern PL in a frequency, and FIG. 12 is a schematic view of the radiation pattern PL of FIG. 11 in an H-plane or an E-plane.

The lower a dot density in FIG. 7, FIG. 9, and FIG. 11 is, the higher a gain value becomes. In the schematic views of FIG. 8, FIG. 10, and FIG. 12, there are five lines T1 to T5. The line T1 is a total gain value, the line T2 is the gain value in a θ direction, the line T3 is the gain value in a ϕ direction, the line T4 is the gain value in a left direction, and the line T5 is the gain value in a right direction. It can be observed from FIG. 11 and FIG. 12 that the radiation pattern PL jointly generated from the first transmitting antenna 4A and the second transmitting antenna 4B is a left circular polarization and is substantially a circle.

Moreover, a phase difference between the first receiving antenna 5A and the second receiving antenna 5B is preferably 90 degrees. In this way, an electromagnetic field of the first receiving antenna 5A and an electromagnetic field of the second receiving antenna 5B can be perpendicular to each other on the elevation plane (i.e., theta) and the azimuth plane (i.e., phi), so as to produce a right-handed circular polarization (RHCP) having a smaller axial ratio.

Figure 13:
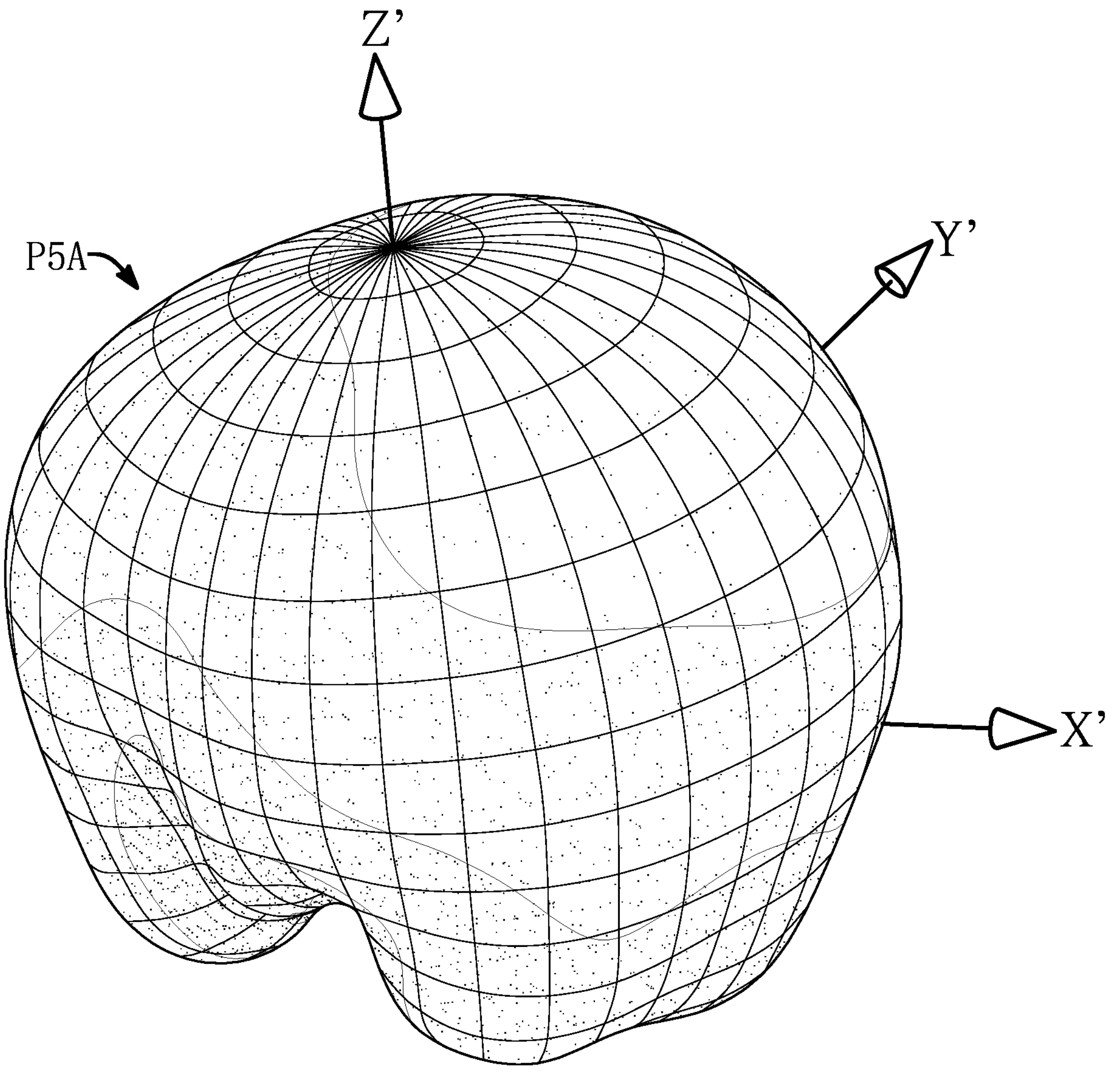
FIG. 13 is a schematic diagram of a radiation pattern generated from a first receiving antenna of the dual-frequency antenna structure according to the second embodiment of the present disclosure.
Figure 14:
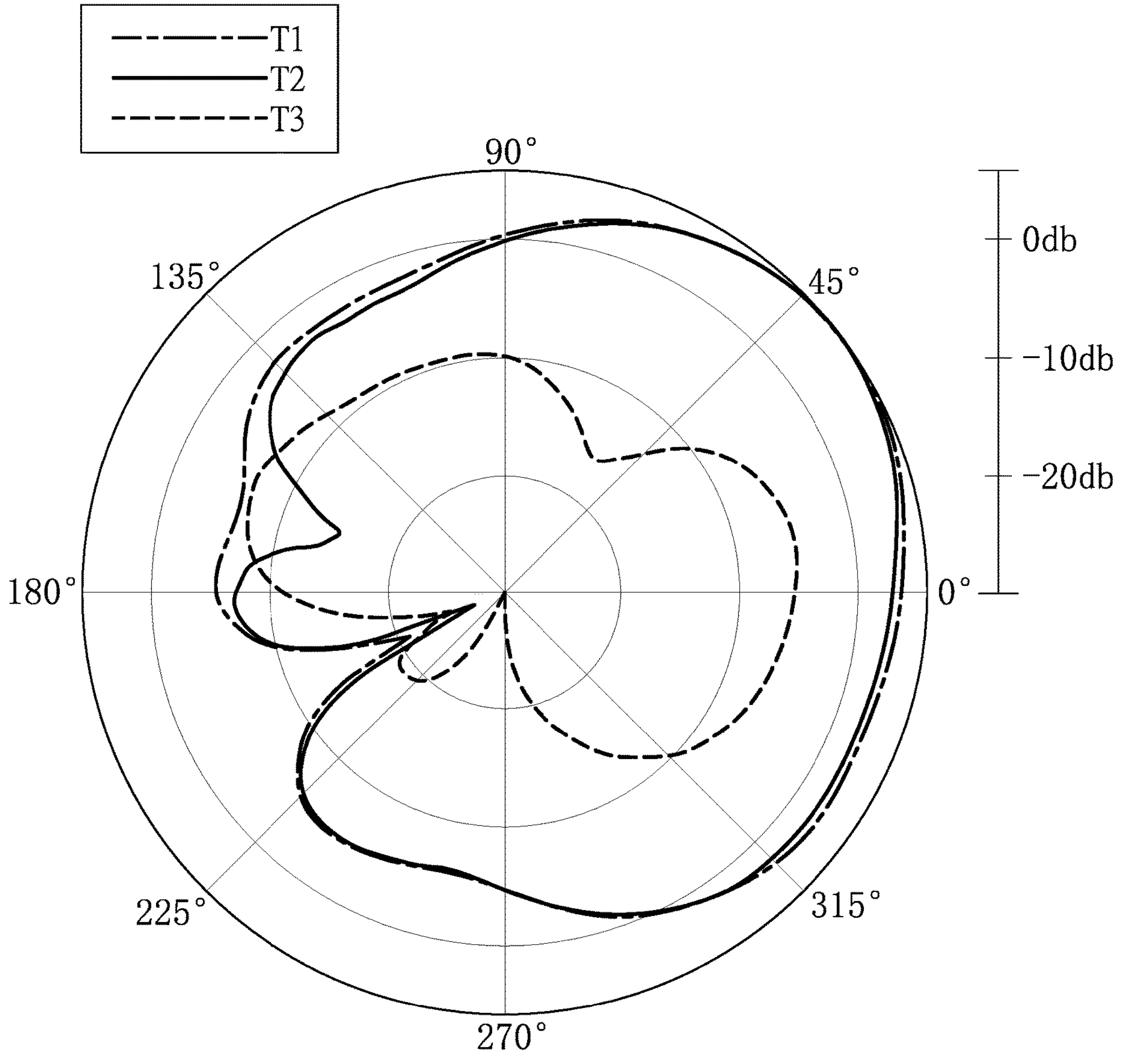
FIG. 14 is a schematic view of the radiation pattern of FIG. 13 in the H-plane or the E-plane.
Figure 15:
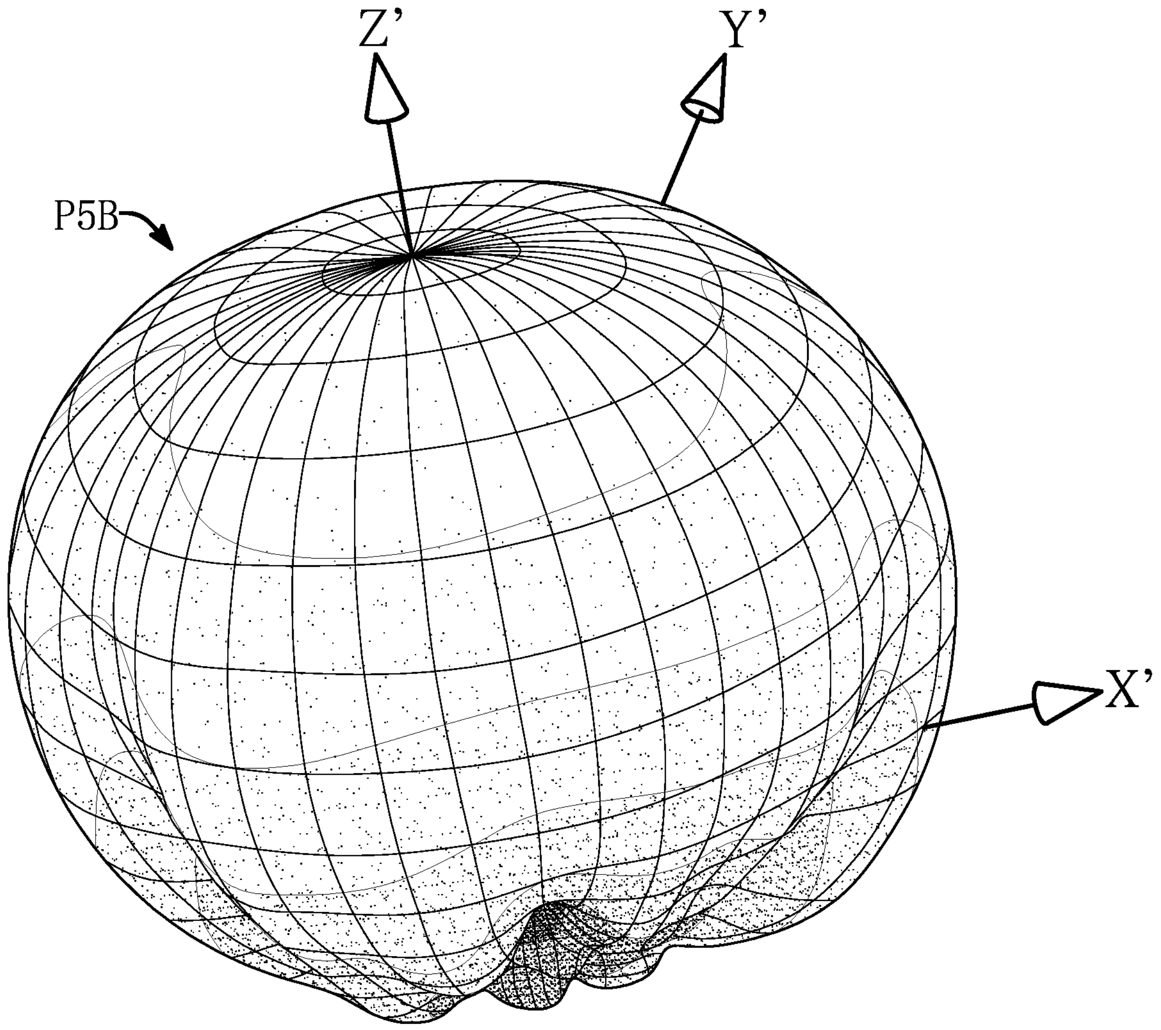
FIG. 15 is a schematic diagram of a radiation pattern generated from a second receiving antenna of the dual-frequency antenna structure according to the second embodiment of the present disclosure.
Figure 16:
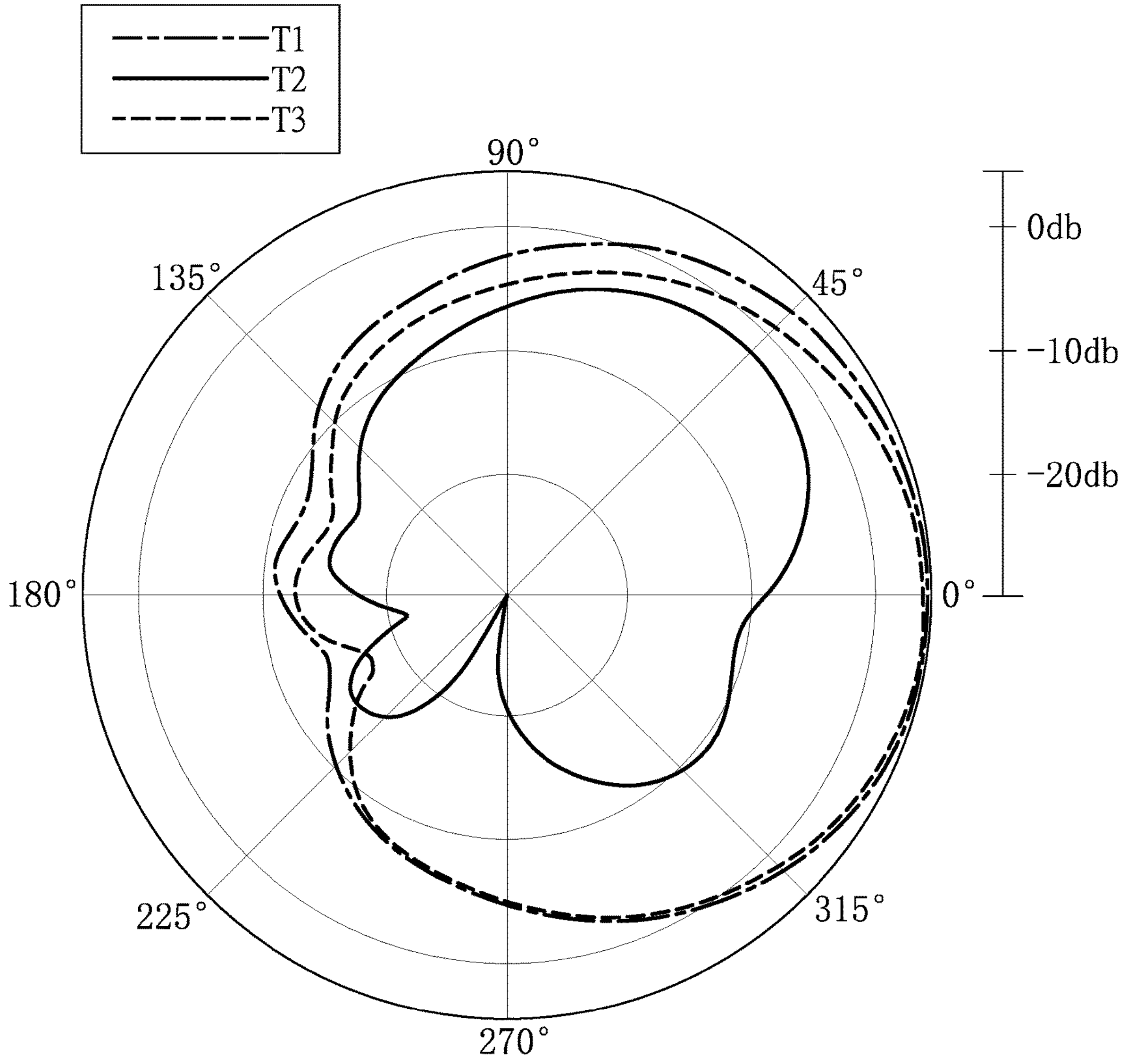
FIG. 16 is a schematic view of the radiation pattern of FIG. 15 in the H-plane or the E-plane.
Figure 17:
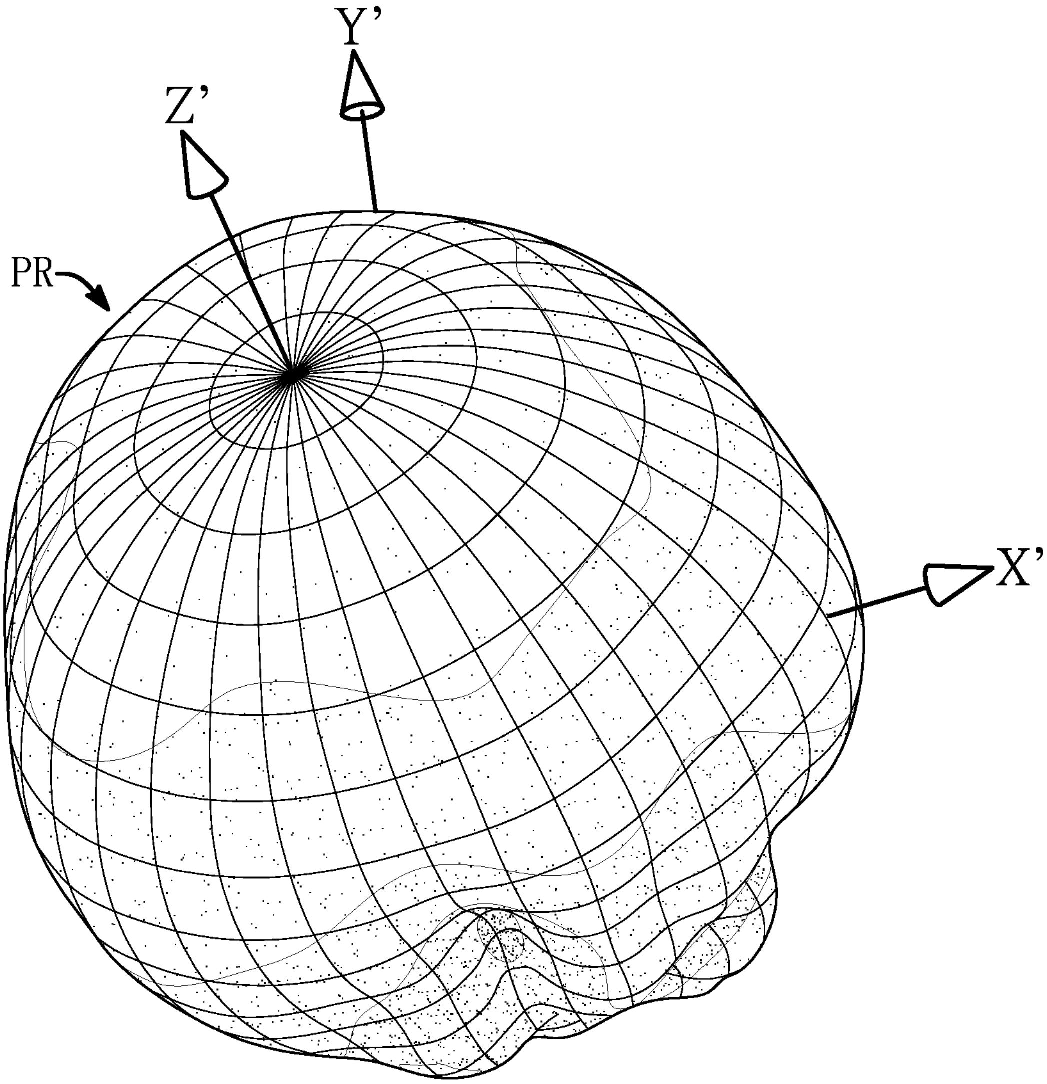
FIG. 17 is a schematic diagram of a radiation pattern jointly generated from the first receiving antenna and the second receiving antenna of the dual-frequency antenna structure according to the second embodiment of the present disclosure.
Figure 18:
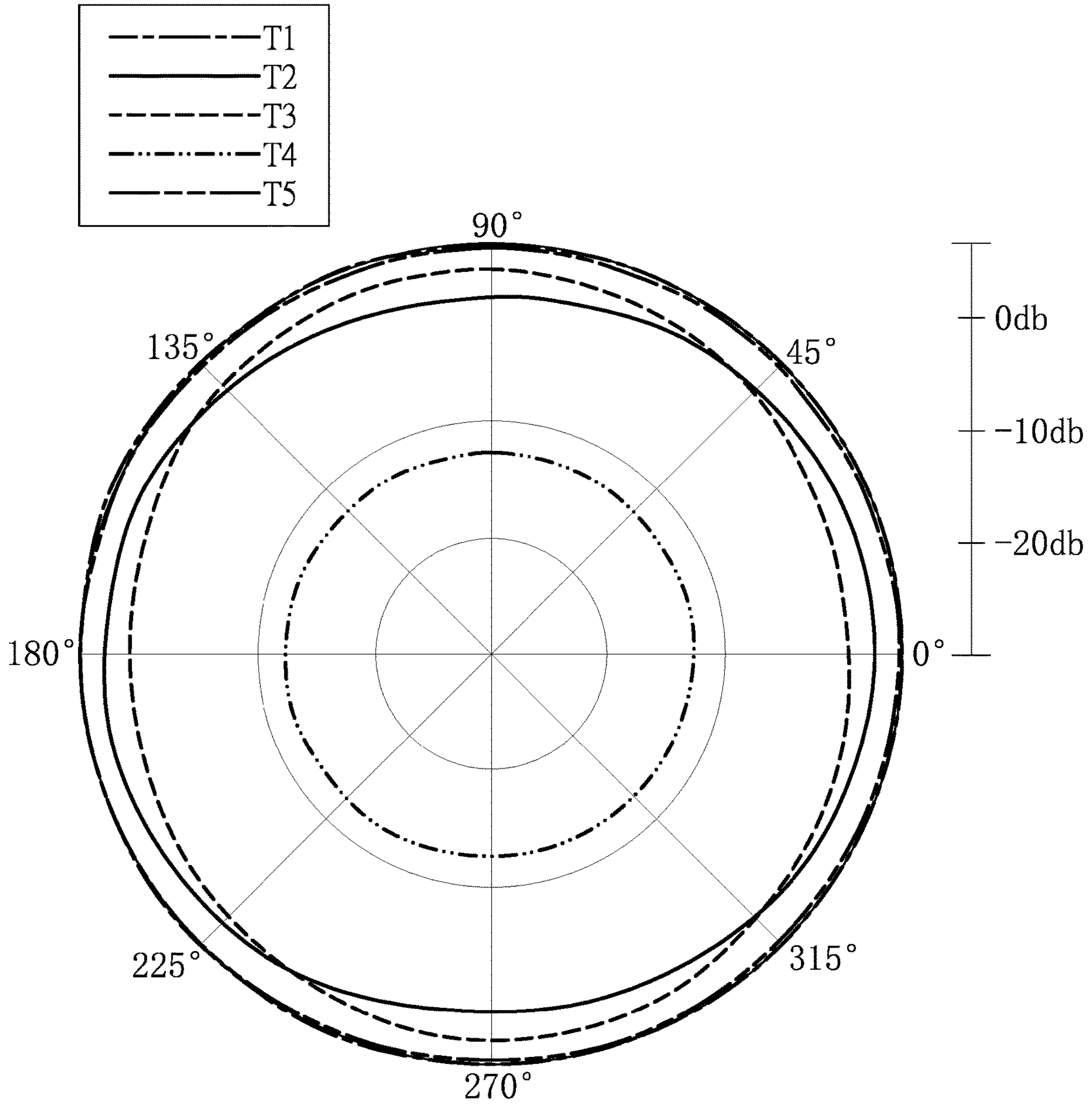
FIG. 18 is a schematic view of the radiation pattern of FIG. 17 in the H-plane or the E-plane.

For example, as shown in FIG. 13, the first receiving antenna 5A of the present embodiment can independently generate a radiation pattern P5A in a frequency, and FIG. 14 is a schematic view of the radiation pattern P5A of FIG. 13 in an H-plane or an E-plane. As shown in FIG. 15, the second receiving antenna 5B of the present embodiment can independently generate a radiation pattern P5B in a frequency, and FIG. 16 is a schematic view of the radiation pattern P5B of FIG. 15 in an H-plane or an E-plane. As shown in FIG. 17, the first receiving antenna 5A and the second receiving antenna 5B of the present embodiment can jointly generate a right-handed circularly polarized radiation pattern PR in a frequency, and FIG. 18 is a schematic view of the radiation pattern PR of FIG. 17 in an H-plane or an E-plane.

The lower the dot density in FIG. 13, FIG. 15, and FIG. 17 is, the higher the gain value becomes. In the schematic views of FIG. 14, FIG. 16, and FIG. 18, there are the five lines T1 to T5. The line T1 is the total gain value, the line T2 is the gain value in the θ direction, the line T3 is the gain value in the ϕ direction, the line T4 is the gain value in the left direction, and the line T5 is the gain value in the right direction. It can be observed from FIG. 17 and FIG. 18 that the radiation pattern PR jointly generated from the first receiving antenna 5A and the second receiving antenna 5B is a right circular polarization and is substantially a circle.

Third Embodiment

Figure 19:
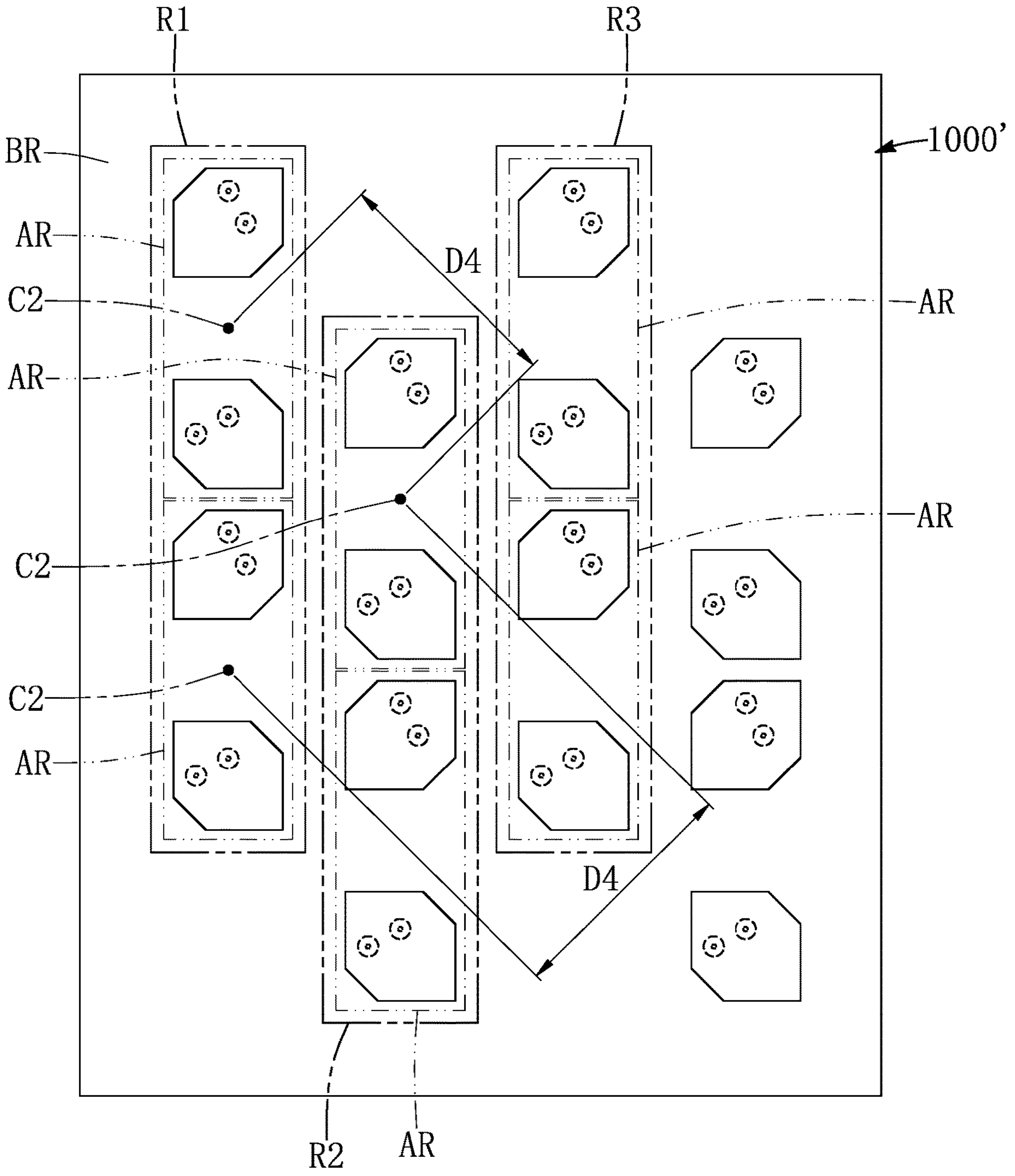
FIG. 19 is a schematic planar view of the dual-frequency antenna structure according to a third embodiment of the present disclosure.

Referring to FIG. 19 to FIG. 25, a third embodiment of the present disclosure provides an antenna device 1000'. As shown in FIG. 19, the antenna device 1000' in the present embodiment is similar to the antenna device 1000 of the second embodiment, and the similarities therebetween will not be repeated herein. The difference between the present embodiment and the second embodiment mainly resides in that the antenna device 1000' includes multiple ones of the antenna array AR.

Specifically, as shown in FIG. 19, the antenna arrays AR in the present embodiment form a staggered arrangement in a plurality of rows and a plurality of columns, and each of the antenna arrays AR has a center point C2. In any two adjacent ones of the rows, two center points C2 of any two adjacent ones of the antenna arrays AR that are not in the same row have a fourth shortest distance D4, and the fourth shortest distance D4 is preferably within a range from 0.45 to 0.55 times the wavelength corresponding to the center frequency of the transmission frequency band. Accordingly, the antenna arrays AR can interact with each other, so that a right-handed circular polarization and a left-handed circular polarization finally produced by the antenna device' 1000 can have a smaller axial ratio.

Figure 20:
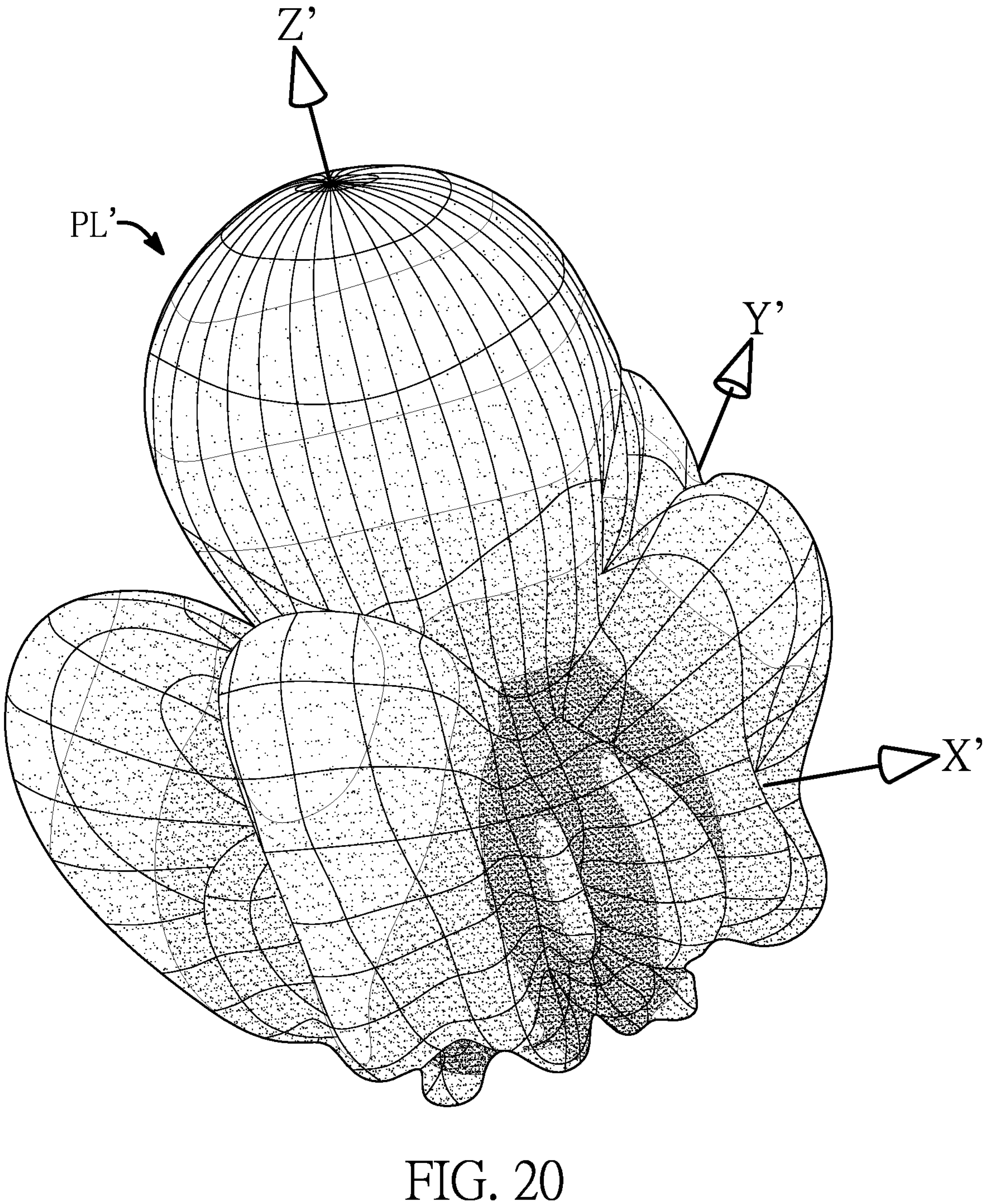
FIG. 20 is a schematic diagram of a radiation pattern jointly generated from the first transmitting antenna and the second transmitting antenna of the dual-frequency antenna structure according to the third embodiment of the present disclosure.
Figure 21:
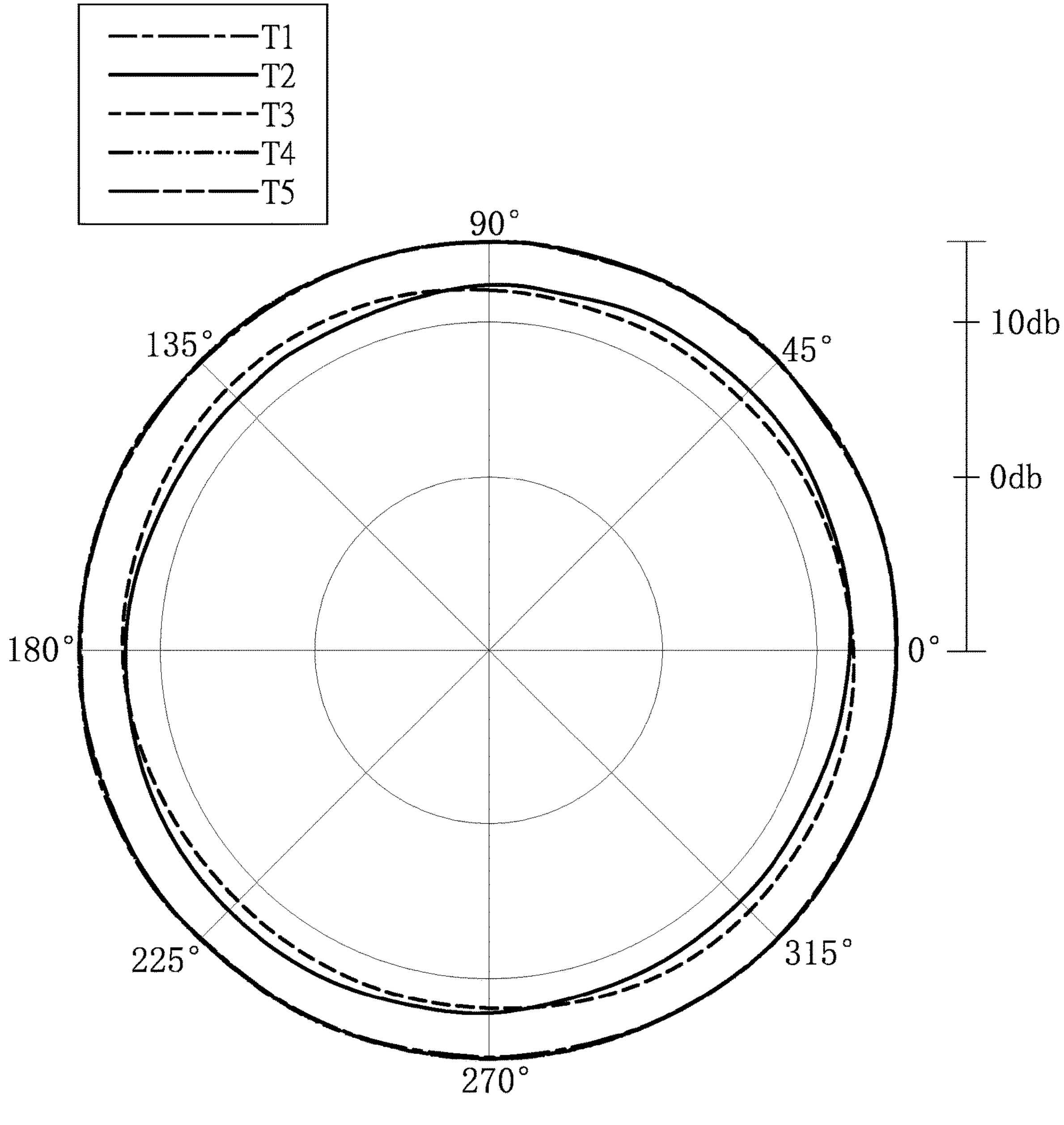
FIG. 21 is a schematic view of the radiation pattern of FIG. 20 in the H-plane or the E-plane.

For example, when a signal of "1W, 90°" is input to the first transmitting antenna 4A of each of the first dual-frequency antenna structures 100A, and a signal of "1W, 0°" is input to the second transmitting antenna 4B of each of the second dual-frequency antenna structures 100B, the antenna device within the range from 10.7 GHz to 12.7 GHz can obtain a left-handed circularly polarized radiation pattern PL' of FIG. 20. FIG. 21 is a schematic view of the radiation pattern PL' in an H-plane or an E-plane.

Figure 22:
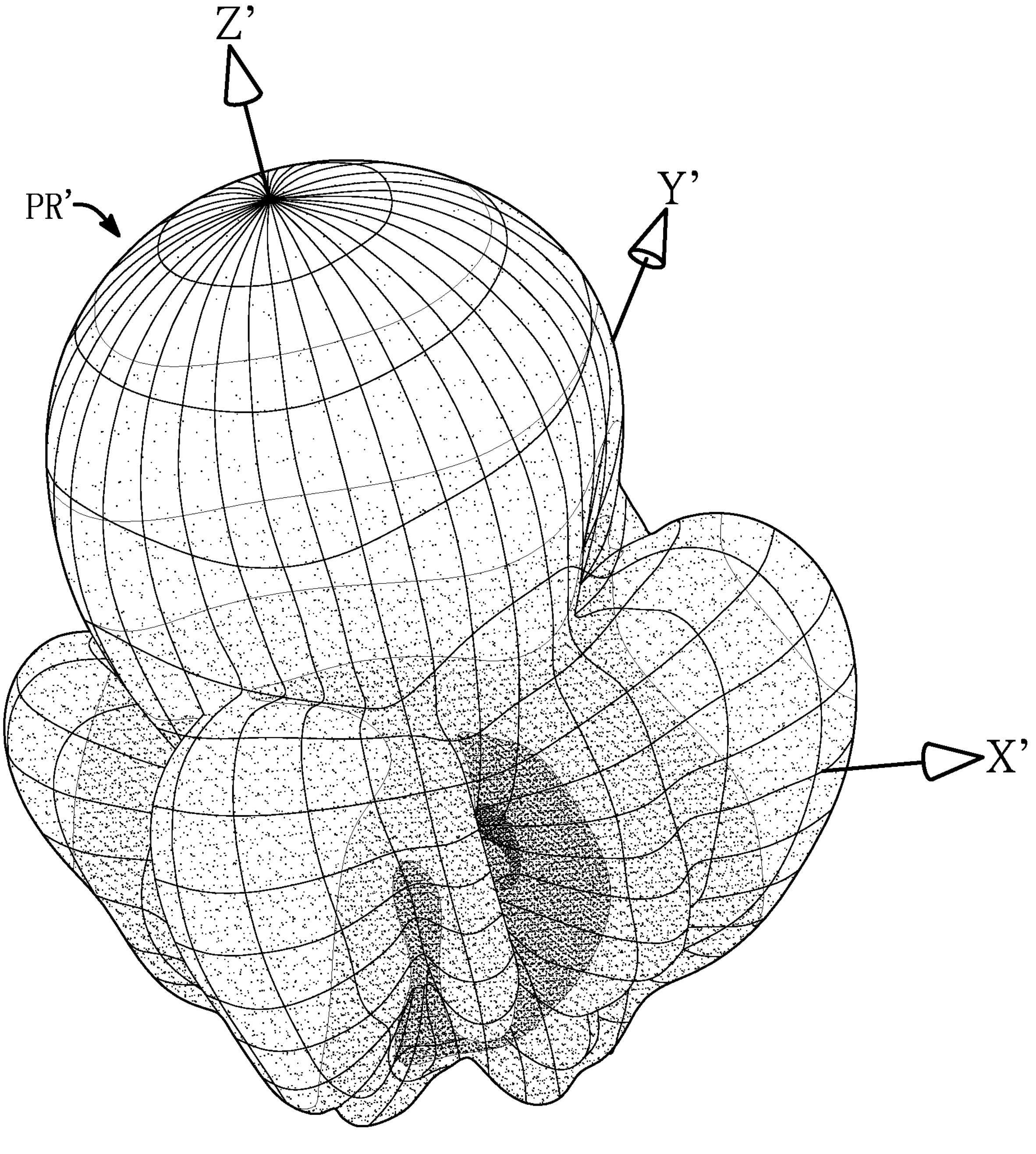
FIG. 22 is a schematic diagram of a radiation pattern jointly generated from the first receiving antenna and the second receiving antenna of the dual-frequency antenna structure according to the third embodiment of the present disclosure.
Figure 23:
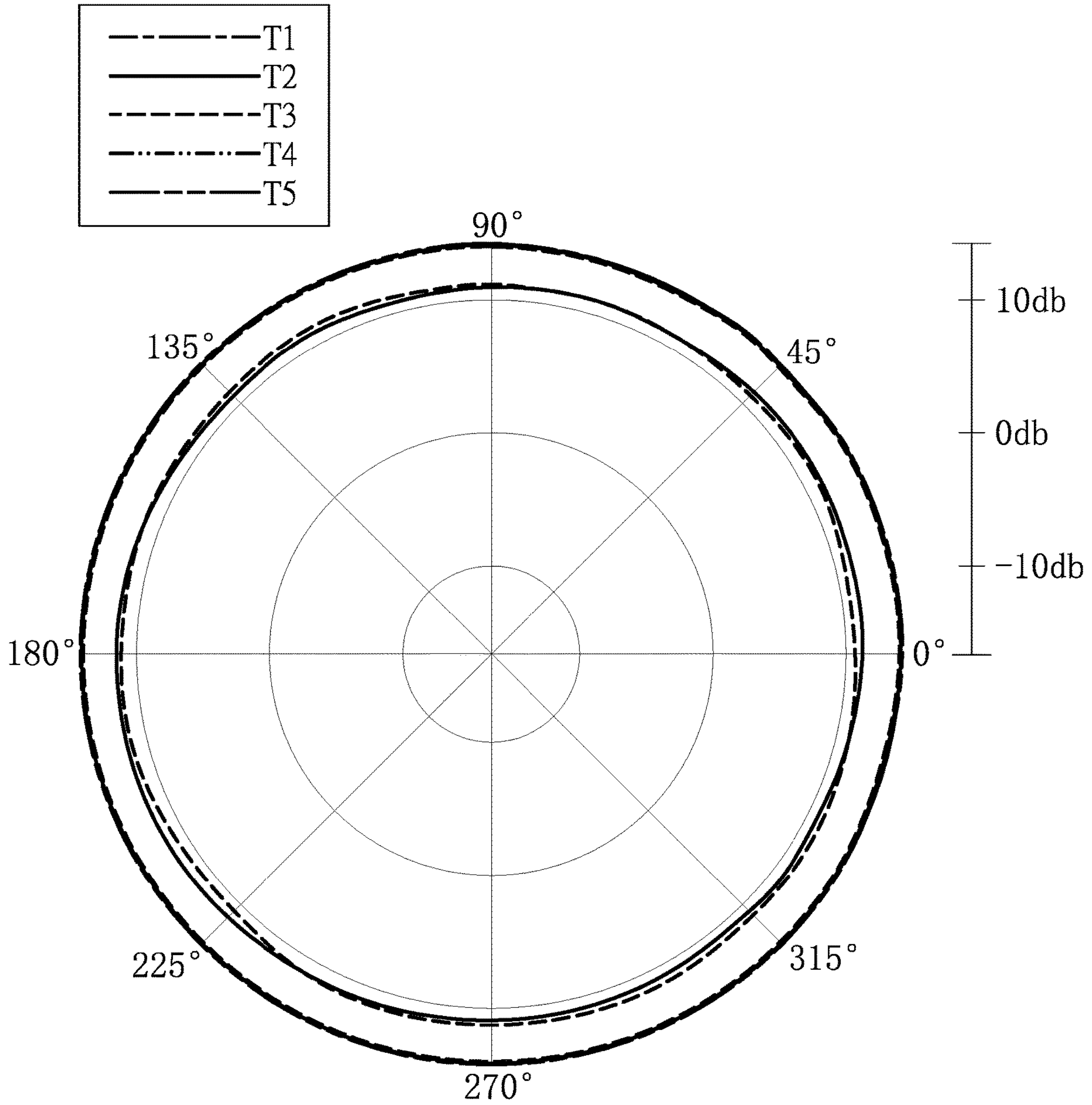
FIG. 23 is a schematic view of the radiation pattern of FIG. 22 in the H-plane or the E-plane.

In addition, when the signal of "1W, 0°" is input to the first receiving antenna 5A of each of the first dual-frequency antenna structures 100A, and the signal of "1W, 90°" is input to the second receiving antenna 5B of each of the second dual-frequency antenna structures 100B, the antenna device within the range from 10.7 GHz to 12.7 GHz can obtain a right-handed circularly polarized radiation pattern PR' of FIG. 22. FIG. 23 is a schematic view of the radiation pattern PR' in an H-plane or an E-plane.

The lower the dot density in FIG. 20 and FIG. 22 is, the higher the gain value becomes. In the schematic views of FIG. 21 and FIG. 23, there are the five lines T1 to T5. The line T1 is the total gain value, the line T2 is the gain value in the θ direction, the line T3 is the gain value in the ϕ direction, the line T4 is the gain value in the left direction, and the line T5 is the gain value in the right direction. It can be observed from FIG. 21 and FIG. 23 that axial ratios of the two radiation patterns PL', PR' are significantly smaller than those of the second embodiment.

It should be noted that the antenna device 1000' in the present embodiment can also have an advantage of beam switching. Specifically, in any two adjacent ones of the rows, a phase difference between the first transmitting antennas 4A of any two adjacent ones of the antenna arrays AR that are not in the same row is 50 degrees or 0 degrees, and a phase difference between the second transmitting antennas 4B of any two adjacent ones of the antenna arrays AR that are not in the same row is 50 degrees or 0 degrees.

Figure 24:
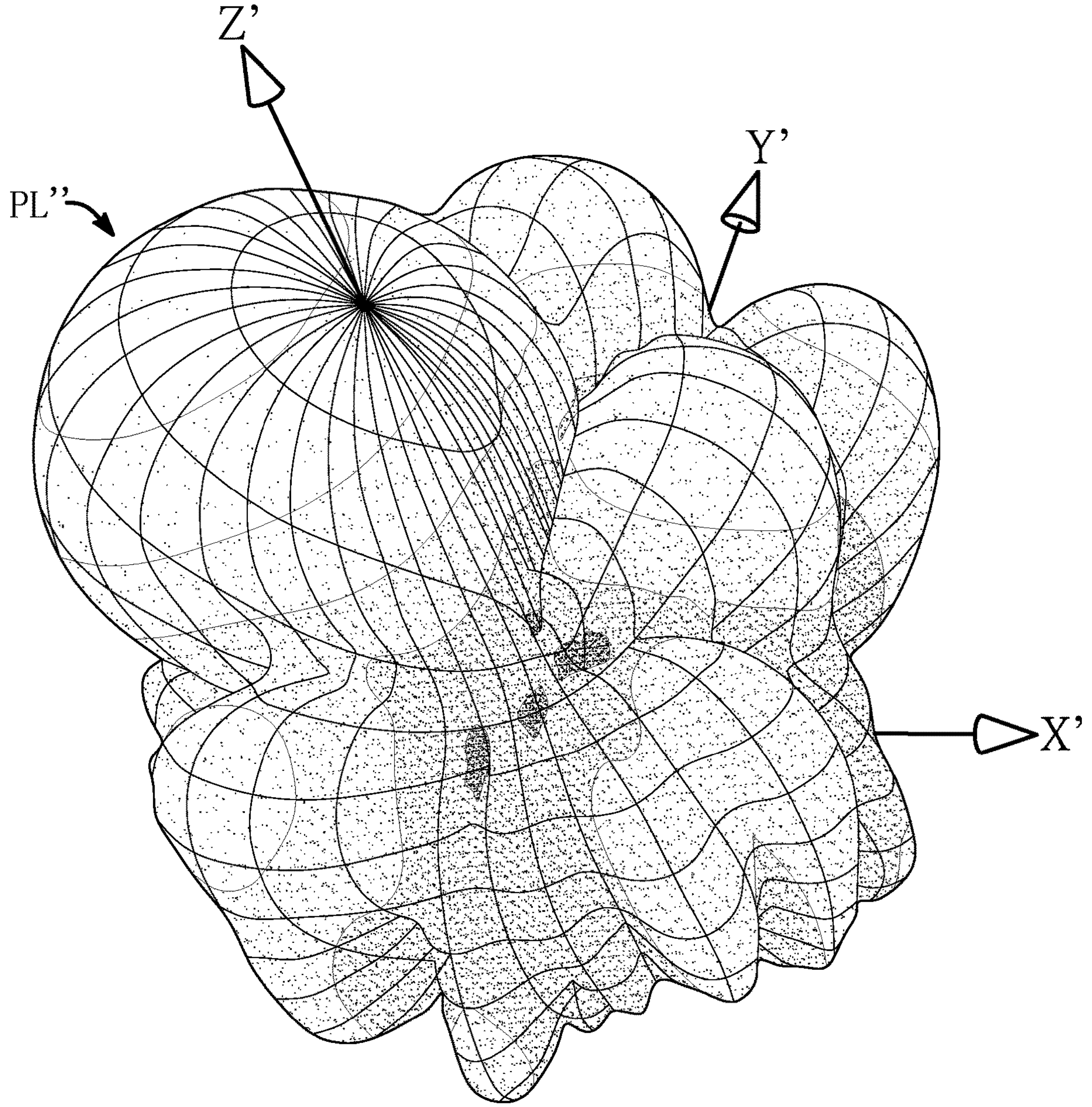
FIG. 24 is a schematic diagram of a left-handed circularly polarized radiation pattern jointly generated from the first transmitting antenna and the second transmitting antenna when switching beams according to the third embodiment of the present disclosure.

For example, when each of the first transmitting antennas 4A and each of the second transmitting antennas 4B that are in a first row R1 are respectively input with the signal of "1W, 0°" and the signal of "1W, 90°", each of the first transmitting antennas 4A and each of the second transmitting antennas 4B that are in a second row R2 may be respectively input with a signal of "1W, 50°" and a signal of "1W, 140°", and each of the first transmitting antennas 4A and each of the second transmitting antennas 4B that are in a third row R3 may be respectively input with a signal of "1W, 100°" and a signal of "1W, 190°" (and so on). Accordingly, the antenna device 1000' can implement beam switching corresponding to the left-handed circular polarization, so as to generate a radiation pattern PL" as shown in FIG. 24. The lower the dot density in FIG. 24 is, the higher the gain value becomes.

Furthermore, in any two adjacent ones of the rows, a phase difference between the first receiving antennas 5A of any two adjacent ones of the antenna arrays AR that are not in the same row is 50 degrees or 0 degrees, and a phase difference between the second receiving antennas 5B of any two adjacent ones of the antenna arrays AR that are not in the same row is 50 degrees or 0 degrees.

Figure 25:
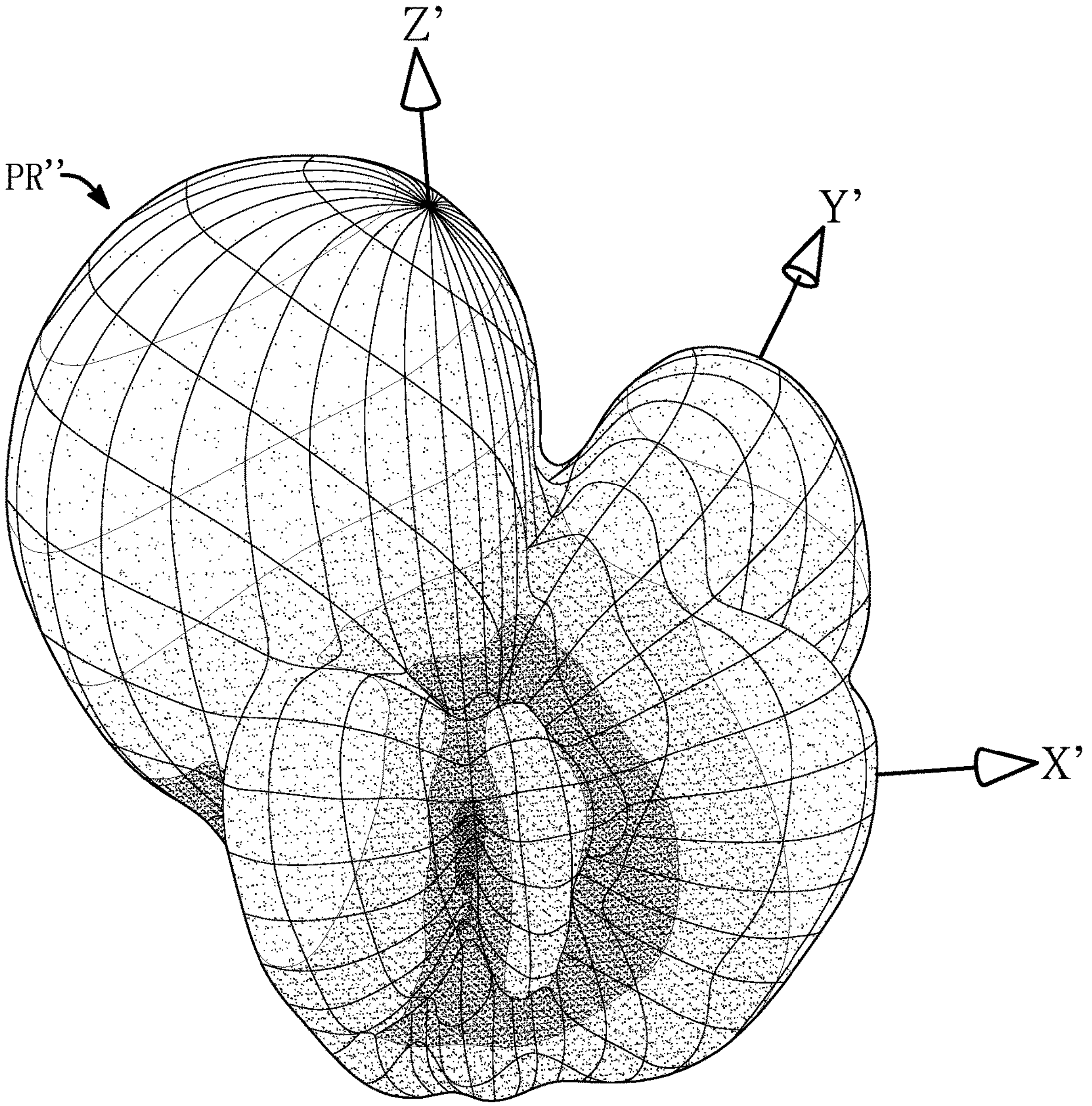
FIG. 25 is a schematic diagram of a right-handed circularly polarized radiation pattern jointly generated from the first transmitting antenna and the second transmitting antenna when switching beams according to the third embodiment of the present disclosure.

For example, when each of the first receiving antennas 5A and each of the second receiving antennas 5B that are in the first row R1 are respectively input with the signal of "1W, 90°" and the signal of "1W, 0°", each of the first receiving antennas 5A and each of the second receiving antennas 5B that are in the second row R2 may be respectively input with the signal of "1W, 140°" and the signal of "1W, 50°", and each of the first receiving antennas 5A and each of the second receiving antennas 5B that are in the third row R3 may be respectively input with the signal of "1W, 190°" and the signal of "1W, 100°" (and so on). Accordingly, the antenna device 1000' can implement beam switching corresponding to the right-handed circular polarization, so as to generate a radiation pattern PR" as shown in FIG. 25. The lower the dot density in FIG. 25 is, the higher the gain value becomes.

Beneficial Effects of the Embodiments

In conclusion, in the antenna device provided by the present disclosure, by virtue of "a first extension line passing through both a center of a projection region defined by orthogonally projecting the first transmitting antenna onto the first conductive sheet and a center of a projection region defined by orthogonally projecting the first receiving antenna onto the first conductive sheet," "a second extension line passing through both a center of a projection region defined by orthogonally projecting the second transmitting antenna onto the second conductive sheet and a center of a projection region defined by orthogonally projecting the second receiving antenna onto the second conductive sheet," and "the first extension line and the second extension line having an angle of 90 degrees there-between and an intersection point, and the first conductive sheet and the second conductive sheet having a four-fold rotational symmetry relative to the intersection point," the antenna device can not only have an effect of an ideal circular polarization pattern, but also have a reduced size.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna device, comprising:

a carrier; and a plurality of antenna arrays disposed on the carrier, wherein the antenna arrays form a staggered arrangement in a plurality of rows and a plurality of columns, and each of the antenna arrays includes:

a first dual-frequency antenna structure, wherein the first dual-frequency antenna structure includes a first conductive sheet, and a first transmitting antenna and a first receiving antenna that are electrically coupled to the first conductive sheet; wherein a first extension line passes through both a center of a projection region defined by orthogonally projecting the first transmitting antenna onto the first conductive sheet and a center of a projection region defined by orthogonally projecting the first receiving antenna onto the first conductive sheet; and a second dual-frequency antenna structure, wherein the second dual-frequency antenna structure includes a second conductive sheet, and a second transmitting antenna and a second receiving antenna that are electrically coupled to the second conductive sheet; wherein a second extension line passes through both a center of a projection region defined by orthogonally projecting the second transmitting antenna onto the second conductive sheet and a center of a projection region defined by orthogonally projecting the second receiving antenna onto the second conductive sheet;

wherein the first extension line and the second extension line have an angle of 90 degrees there-between and an intersection point, and the first conductive sheet and the second conductive sheet have a four-fold rotational symmetry relative to the intersection point.

2. The antenna device according to claim 1, wherein the antenna device is configured to be operated in a transmission frequency band, and each of the antenna arrays has a center point; wherein, in any two adjacent ones of the plurality of rows, a shortest distance is defined between the center points of any two adjacent ones of the antenna arrays that are not in the same row, and the shortest distance is within a range from 0.45 to 0.55 times a wavelength corresponding to a center frequency of the transmission frequency band.

3. The antenna device according to claim 1, wherein, in any two adjacent ones of the plurality of rows, a phase difference between the first transmitting antennas of any two adjacent ones of the antenna arrays that are not in the same row is 50 degrees or 0 degrees, and a phase difference between the second transmitting antennas of any two adjacent ones of the antenna arrays that are not in the same row is 50 degrees or 0 degrees.

4. The antenna device according to claim 1, wherein, in any two adjacent ones of the plurality of rows, a phase difference between the first receiving antennas of any two adjacent ones of the antenna arrays that are not in the same row is 50 degrees or 0 degrees, and a phase difference between the second receiving antennas of any two adjacent ones of the antenna arrays that are not in the same row is 50 degrees or 0 degrees.

5. The antenna device according to claim 1, wherein a phase difference between the first transmitting antenna and the second transmitting antenna is 90 degrees, and a phase difference between the first receiving antenna and the second receiving antenna is 90 degrees.

6. The antenna device according to claim 1, wherein the first transmitting antenna and the second transmitting antenna are each configured to generate a left-handed circular polarization, and the first receiving antenna and the second receiving antenna are each configured to generate a right-handed circular polarization.

7. The antenna device according to claim 1, wherein each of the first transmitting antenna and the first receiving antenna is in a circular shape, and each of the second transmitting antenna and the second receiving antenna is in a circular shape.

* * * * *